US005416847A

United States Patent [19]

Boze

[11] Patent Number: 5,416,847

[45] Date of Patent: May 16, 1995

[54] MULTI-BAND, DIGITAL AUDIO NOISE FILTER

[75] Inventor: Steven E. Boze, Valencia, Calif.

[73] Assignee: The Walt Disney Company, Burbank, Calif.

[21] Appl. No.: 17,133

[22] Filed: Feb. 12, 1993

[51] Int. Cl.[6] .............................................. H04B 15/00

[52] U.S. Cl. .......................................... 381/94; 381/98

[58] Field of Search .................. 381/98, 68.2, 94, 68.4

[56] References Cited

U.S. PATENT DOCUMENTS 3,484,591 12/1969 Trimble .
3,541,458 11/1970 Klund .
3,614,673 10/1971 Kang .
4,141,072 2/1979 Perreault .
4,435,751 3/1984 Hori et al. .
4,628,529 12/1986 Borth et al. .
4,658,426 4/1987 Chabries et al. .
4,665,494 5/1987 Tanaka et al. .
4,683,590 7/1987 Miyoshi et al. .
4,852,175 7/1989 Kates .
4,896,285 1/1990 Ishikawa et al. .
5,027,410 6/1991 Williamson et al. .
5,029,218 7/1991 Nagayasu .

*Primary Examiner*—Forester W. Isen
*Attorney, Agent, or Firm*—Pretty, Schroeder, Brueggemann & Clark

[57] ABSTRACT

This disclosure provides a multi-band, digital audio noise filter that is especially useful in the restoration of motion picture film soundtracks. More particularly, the preferred embodiment presented herein utilizes a remote fader board having eight faders which permit a user to control thresholds for sixty-four frequency bins. These faders are monitored by a MOTOROLA 56000-series microprocessor, which accepts digitized audio input signals, performs a Fast Fourier Transform upon a 128 sample window to yield signal contribution for each of the sixty-four frequency bins, and derives FIR filter coefficients for noise attenuation. The digitized audio input signals, which have been stored in a circular input buffer, are convolved with the FIR filter and output as the digitized output signals of the restored motion picture soundtrack.

31 Claims, 3 Drawing Sheets

MULTI-BAND, DIGITAL AUDIO NOISE FILTER

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This invention relates to a noise reduction system, and in particular, to a multi-band, digital audio noise filter. Still more particularly, this invention provides a device that is especially useful in the restoration of motion picture film and other audio tracks.

BACKGROUND

1. Brief Explanation of Fourier Analysis as it is Relevant to the Current Invention Fourier analysis has long been viewed as a useful tool in the use of electromagnetic waves, such as radio waves, to carry information. At a basic level, Fourier analysis represents an attempt to break down the composition of any type of wave into groups of pure harmonics which combine to produce the wave. As a brief example of the use of Fourier analysis, ocean waves may be observed as changes in water level at a fixed point over time. Yet, this water movement is also represented by a superposition of waves of distinct frequencies of oscillation, each wave of different frequency having a different strength. In other words, a non-periodic pattern is always representable as some combination of different harmonics at different strengths. Fourier analysis is a thus useful tool that enables conversion between time-based measurement, for example, water level as a function of time, and frequency-based measurement, or levels of harmonic strength as a function of frequency.

Fourier analysis has been applied significantly in recent times to speech and audio processing, and in particular to digital electronic audio processing systems. These digital systems, which for example include compact disk systems, utilize numbers in lieu of voltage levels which are used by more traditional analog electronics. As an example, audio information is frequently stored upon magnetic tape, yet the tape's storage conditions may affect the resolution of some audio data in playback. With digital systems, such as for example compact disk systems, individual numbers (which correspond to analog voltage levels at discrete, sequential times) may nearly always be exactly obtained and audio information derived therefrom. The only significant limitation is that sufficient quantities of numbers used to reproduce audio data need to be obtained to avoid an effect known as "aliasing." That is, the rate of numbers provided to reproduce audio data needs to be at least twice the highest frequency of the audio data.

In these digital systems, Fourier analysis is used to convert between a time-based measurement and a frequency-based measurement to enable analysis of harmonics. In many modern approaches, a process known as a Fast Fourier Transform may be used to convert time-based digital values into strength values for each of a number of separate frequencies that make up the time-based signal. The Fast Fourier Transform is simply a manipulation of time-based data, derived from traditional Fourier analysis of signals, which makes use of computational shortcuts, such as signal analysis over limited time ranges, frequency ranges, or other shortcuts. For example, since computers and other microprocessor-based systems typically perform many functions in a limited amount of time allocated for one program loop, they generally can perform only a small number of multiplications over localized digital values, to obtain current frequency data in relation to a small segment of the corresponding time-based signal. Thus, a Fast Fourier Transform implemented in computers and the like provide a tool whereby a limited number, generally a few dozen to one-thousand, of digital values that make up a digital signal which has been segmented in time are efficiently converted to time-localized, frequency-based information. The Fast Fourier Transform may be performed repeatedly, upon "windows" of the digital values, to efficiently derive time-localized frequency information over different segments of an audio signal.

2. The Problem at Hand in Relation to the Prior Art

One area of audio processing to which Fourier analysis has been applied is to the reduction of noise in analog audio signals. For example, a very simple type of noise reduction used for audio signals may be accomplished with an audio equalizer by attenuation of certain audio bands, reducing some types of hiss. However, this attenuation has the undesired effect of also attenuating wanted data of the audio signal.

One particular application of Fourier analysis to reduce noise is in hearing aids, where it is known to employ attenuation that is dependent upon the characteristics of the audio signal. For example, an especially high level of attenuation may be applied to frequency ranges that have no speech or other desired audio signal present which might be combined with noise. The attenuation may be lessened or removed when certain harmonics which represent desired audio signals are present.

Another application to which noise reduction schemes are important, and which motivates the preferred embodiment of the current invention, is in the recording of audio tracks, for example, speech or music. More particularly, the prior art does not provide low-cost noise reduction schemes which enable an operator to interactively modify attenuation in response to desired components of the audio tracks, such as speech, music, or other desired sounds that may be partially obscured by noise. Unlike the hearing aid systems, which are typically addressed to reducing ambient noise to sounds in the environment, noise reduction systems as applied to the generation of audio tracks preferably allow for operator control, as an operator may generally interactively distinguish unwanted obscuring noise from desired audio components and modify the noise reduction scheme in real-time. However, many of these noise reduction schemes are accomplished by use of an equalizer device, discussed above, which the operator may utilize to directly amplify or attenuate audio components which fall within distinct frequency bands. Equalizers are less than optimal, because to provide optimal noise reduction they must continuously and impractically be readjusted, for example, each time a particular sound or voice stops and starts.

A more popular noise reduction scheme used for restoration and registration of audio tracks which addresses this deficiency is a device commonly known as a "noise gate." A noise gate generally is an analog device that features a capacitive threshold that is applied across all frequencies that make up the desired audio signal. According to the attenuation scheme featured by typical noise gates, sounds that are loud are passed by the noise gate as an output signal with little or no attenuation, while softer sounds not meeting the electronically-imposed threshold are substantially attenuated.

Thus, using a rock concert as an example, a noise gate would generally attenuate constant sounds, such as crowd noise and the like. Some more advanced noise gates may feature as many as four different capacitive thresholds which are applied in isolation across different frequency ranges. However, these devices are not efficiently applied to restoration and registration of audio tracks. For example, using again the rock concert example, it might be desired to emphasize or de-emphasize crowd noise occurring within a single audio track over other sounds appearing within the same track. Alternatively, it might be desired to hear a cymbal crash, as an example, over a length of time, which might be not be passed by a noise gate as an audio output signal if the desired sound is long in duration. Furthermore, many of the advanced noise gates are prohibitively expensive.

There exists a need for a device that allows for real-time user-interaction to modify thresholds in response to perceived audio data. More particularly, there exists a need for a device that advantageously allows an operator to track and monitor background noise and manipulate attenuation in response thereto, preferably in independent fashion among numerous, distinct frequency bands. A need further exists for a device wherein a given frequency band may be automatically attenuated depending upon whether total sound within the frequency band falls below a threshold, but which doesn't require readjustment each time a voice, music or other desired sound starts and stops. Finally, there exists a need for a low-cost and efficient noise reduction system that can respond to operator control in real time and also to the frequency characteristics of input audio to which the noise reduction system is applied, preferably utilizing Fourier analysis to accomplish this object. The current invention satisfies these needs and provides further related advantages.

SUMMARY OF THE INVENTION

This invention provides a low-cost, multi-band, digital audio noise filter that overcomes the aforementioned difficulties, and that enables real-time user manipulation and control over a relatively complex noise reduction scheme.

The invention as particularly defined by the appended claims includes: a signal processor that processes an audio input signal to obtain an audio output signal by multiplying filter coefficients with time-based digital samples of the audio input signal; a user-interface that permits a user to select thresholds for each of a plurality of frequency ranges for the audio input signal; and a filter generator that repeatedly updates the filter coefficients in dependence upon current harmonics of both the audio input signal and the user-set thresholds. More particularly, the filter generator operates by using a Fast Fourier Transform ("FFT") to produce FFT values for each frequency range, or "bin," by comparing, for each frequency bin, the FFT values with the user-set threshold, by generating an attenuation index for each frequency bin that represents an attenuation of harmonics of the audio signal corresponding to the frequency range, and by generating and updating, in response to the attenuation index for each frequency bin, the filter coefficients that are used to convert the audio input signal into the audio output signal.

DETAILED DESCRIPTION

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of each of the apparatus and two methods, which were summarized above and which are defined in the enumerated claims.

In accordance with the principles of the invention, the preferred embodiment is a multi-band, digital audio noise filter that will be used to restore soundtracks for motion picture films that feature analog audio tracks. More particularly, the preferred embodiment is a system that utilizes a filter that varies during operation and is adjusted in real-time in dependence upon both variable settings and the harmonics of audio signal inputs.

Figure 1:
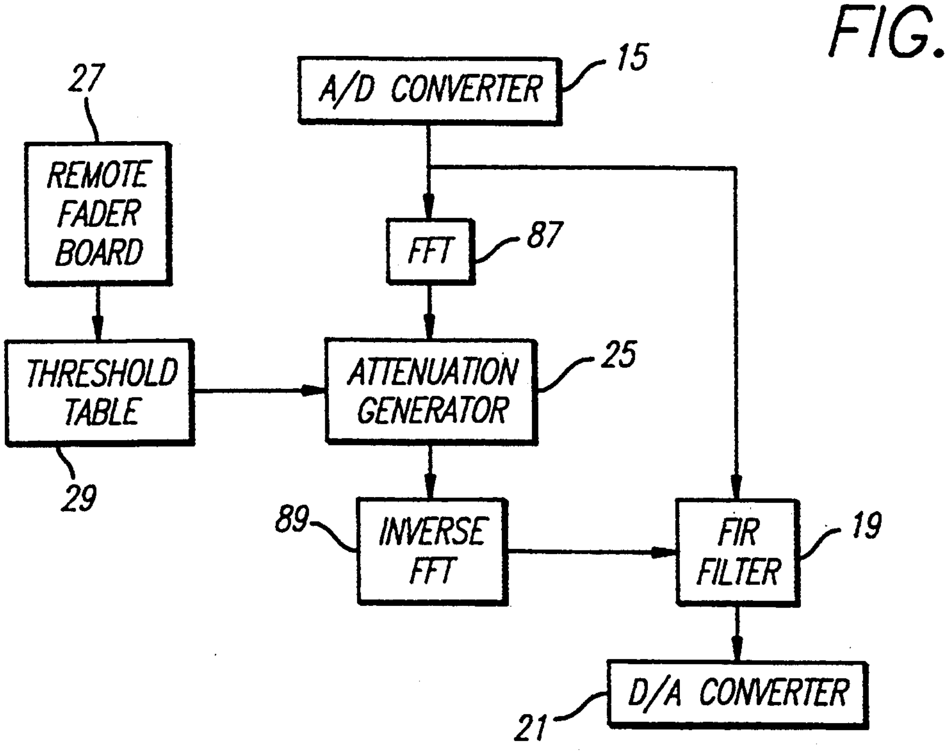
FIG. 1 is a simplified block diagram of the operation of the preferred embodiment, and illustrates application of a digital filter in the time domain and generation of filter coefficients through an attenuation generator in the frequency domain.
Figure 2:
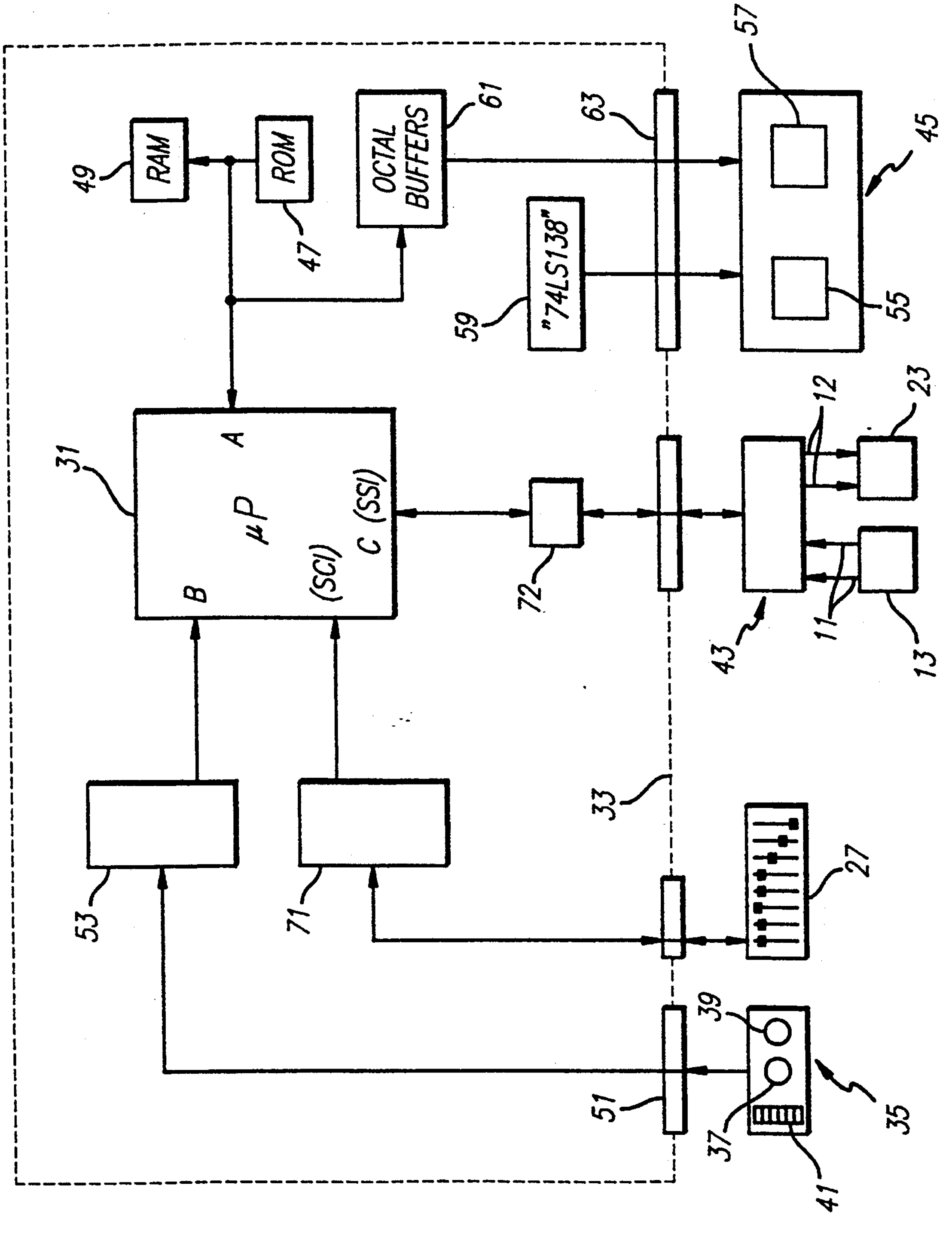
FIG. 2 is an illustrative diagram of the layout of components of the preferred embodiment, including the hardware configuration of a microprocessor-based system and its communication with four contemplated peripheral devices, including a remote fader board.

FIGS. 1 and 2 show an overview of system operation. Analog electronic signals 11 that represent audio tracks from a motion picture soundtrack (generally including "left" and "right" audio tracks) are input from a film reading device 13 to an analog-to-digital ("A/D") converter 15, which approximates sound magnitude represented by the analog electronic signals with numbers, or digital values, for each channel. This "sampling" of the analog signals is performed at rate that is sufficiently high that variations in successive numbers closely track changes in the magnitude of the audio electronic signals. The numbers are passed as a digital electronic signal to an finite impulse response ("FIR") filter 19 that modifies the emphasis of certain frequencies in each channel to thereby reduce the effects of unwanted "noise." The modified electronic digital signals are passed to a digital-to-analog ("D/A") converter 21 that generates analog electronic output signals 12 that will be written upon film by a film writing device 23 as the "restored" soundtrack.

The film reading device 13 has a magnetic head that is adapted to read the soundtrack of motion picture film and thereby generate two analog electronic signals 11, which each respectively represent the left and right channels of stereo sound. Each of these two analog audio input signals 11 is a voltage signal having a variance in voltage magnitude over time which contains the harmonics that may typically be used by loud speakers to reproduce speech, music, and other auditory information.

The left and right channel analog audio input signals 11 are fed to the A/D converter 15, which in turn samples the analog signals and converts them to digital format. In other words, at discrete points in time, the A/D converter 15 assigns digital values to represent the magnitude of each of the analog inputs. As long as the frequency of sampling is greater than twice the highest audio frequency of interest, all of the audio information of interest from the audio inputs signals can be exactly reproduced by the digital values produced by the A/D converter 15.

Digital audio input signals, composed of these digital values transmitted at differing times, are sent from the A/D converter 15 to a microprocessor-based system 17, which is any device having a microprocessor or the like which electronically manipulates data according to sequential data manipulation instructions, or "software."

The microprocessor-based system 17 uses the digital values for each of the left and right audio channels for two purposes. First, the FIR filter 19 is used to modify the frequency characteristics of the audio input signals to create corresponding audio output signals, that is, an output signal for each of the left and right channels. Second, the microprocessor-based system 17 also uses the digital values to derive filter coefficients which characterize the modification of the frequency characteristics of the audio input signal. A FIR filter 19, as the name implies, is one that necessarily has a finite-length response to an input signal, and therefore does not utilize any feedback. These coefficients are simply numbers associated with a fixed-time interval and are associated by the microprocessor-based system 17 with digital values in the input signal. A digital filter, such as the one used in the preferred embodiment, is generally applied by a process known as "convolution," which is explained below.

The preferred embodiment generates one set of filter coefficients, which it then applies to the digital values of the left and right channels to develop the digital audio output signals, which it feeds to the D/A converter 21 to convert these signals into corresponding analog audio output signals 12. These analog signals are then fed to a magnetic head of the film writing device 23 which writes the restored audio tracks onto the soundtrack of a new reel of motion picture film as a "restored" soundtrack.

To generate the filter coefficients, the microprocessor-based system 17 adds together corresponding values of the left and right channel digital values and utilizes a special digital signal microprocessor that is adapted to apply a Fast Fourier Transform ("FFT") to the sum of these digital values. The product of the Fast Fourier Transform consists of a plurality of number pairs, having both real and imaginary parts. Each number pair represents strength of an associated harmonic along each of real and imaginary axes which contributes to the composition of the two audio input signals.

The microprocessor-based system 17 time-averages these FFT products for each one of sixty-four distinct frequency ranges, or "frequency bins," and compares the imaginary part of an averaged number pair with a corresponding user-set contribution-threshold for each frequency bin. In response to the comparisons, the microprocessor-based system 17 generates attenuation as represented by the "Attenuation Generator" block, identified in FIG. 1 by the reference numeral 25. The attenuation for each frequency bin, as implemented in the preferred embodiment, will result in the generation of filter coefficients that permit frequencies that make up the audio input signals to be passed by the FIR filter 19 if those frequencies fall within a frequency bin and exceed the corresponding user-set contribution-threshold for that frequency bin. If the frequencies that make up the audio input signals do not exceed the threshold set for their corresponding frequency bin, they will be attenuated to a level proportional to the ratio of the strength of the frequency range to the corresponding user-set threshold.

Once an attenuation index has been developed for each frequency bin, "1" for frequencies to be passed, or a fraction (the ratio indicated above) for frequencies to be attenuated, the microprocessor-based system 17 generates a real and imaginary value pair for each attenuation index by multiplying the attenuation index by a sine and cosine value pair. An Inverse Fast Fourier Transform, or "IFFT," is then applied to collectively convert the attenuation indices, which relate to different frequencies but do not depend upon time for any given window, into the filter coefficients, which are individually related to time, but not frequency.

The "contribution-thresholds," meaning the threshold for each frequency bin that corresponds to the frequencies of the input signals falling within the frequency bin, may be interactively manipulated by the user, and the effect of change seen in real-time. As will be explained in a detailed explanation of the hardware configuration of the preferred embodiment, below, the preferred embodiment allows for acceptance by the microprocessor-based system 17 of inputs of four different peripherals. In the preferred embodiment, three of these peripherals are utilized, including a remote fader board 27, whereas in an alternative embodiment, only two of these peripheral inputs are utilized. The software causes the microprocessor-based system 17 to monitor the remote fader board 27, or other peripheral, and to maintain a record of the contribution-thresholds in a threshold table 29. The threshold table 29 is simply a number of registers which are defined in random access memory of the microprocessor-based system 17, as discussed below.

With this understanding of the general operation of the preferred embodiment, precise hardware and operational features will now be described.

1. HARDWARE

With reference to FIG. 2, the microprocessor-based system 17 includes a MOTOROLA "XSP56001RC33" microprocessor 31, which is part of a mother board (illustrated by the reference numeral 33 and by the box drawn in phantom lines in FIG. 2). This microprocessor 31 is of particular advantage in digital signal processing applications, since it is particularly speedy at FFT computations, and since it has a number of serial and parallel data ports.

The mother board 33 is configured to utilize a 30.0 megahertz clock, and to separately communicate with three input peripherals, including two alternate user-inputs, and two output peripherals. The alternate user-inputs preferably allow separate user-control over eight groups of eight frequency bins. However, the software, if desired, could readily be modified to permit a different scheme of control, including separate control over each of the sixty-four frequency bins of the preferred embodiment. The 30.0 megahertz clock rate is just above the minimum clock rate needed to run the software of Appendix "A," since one-hundred and twenty-eight new digital values are used, modified and output during each program loop, and since the sampling rate must be at least 32 khz for Fourier analysis of the upper end of a 16 khz frequency range of the sixty-four frequency bins of the preferred embodiment.

A first input peripheral is a rotary shaft encoder box 35, having two rotary shaft encoders 37 and 39 and six push-button switches 41, which may be operated by the user to interactively control contribution-threshold settings. Second, the remote fader board 27 may also, for convenience, be operated by a user to simultaneously and separately control contribution-thresholds for the sixty-four frequency bins of the preferred embodiment, either in the alternative to, or in addition, to the rotary shaft encoder 35.

In an alternative embodiment, software may be written that utilizes both rotary shaft encoders 37 and 39, one encoder to set contribution-threshold of one "key" frequency bin, and the second to adjust the slope, which may be linear, logarithmic, or feature another relation, between adjacent frequency bins. Preferably, the second rotary shaft encoder 39 adjusts the percentage of drop in threshold to each successive lower frequency bin. In this regard, it is noted that it has been found for most audio applications that optimal noise reduction results are obtained with this attenuation scheme, either through the preferred embodiment by manual setting of the easy-to-use remote fader board 27 or the shaft encoder 37, or in the alternative embodiment as described.

An ARIEL "ProPort model 656" communications device 43 is employed remote from the mother board 33 as both an input peripheral and as an output peripheral, to digitize left and right analog audio input signals for serial provision to the mother board 33, and to provide left and right analog audio output signals, derived from serial communications received from the mother board. Thus, this communication device embodies both the A/D and D/A converters of FIG. 1, identified therein by the reference numerals 15 and 21.

Lastly, a display device 45 is coupled to the mother board 33 as the second output peripheral to allow display of a selected frequency bin and its corresponding contribution-threshold. In the preferred embodiment, the rotary shaft encoder box 35 may be utilized to select a "remote" function which causes the microprocessor to accept changes in contribution-thresholds only from the remote fader board 27, if attached. In this mode, the rotary shaft encoder box may be used in conjunction with the display device 45 to select a single group of eight frequency bins and the corresponding contribution-threshold for display by the display device 45. In the preferred embodiment, only one of the two rotary shaft encoders 37 is utilized, to vary contribution-threshold, with frequency bin group selected by use of "up" and "down" buttons (among the six push-button switches 41).

Three ports, designated "A," "B," and "C," of the preferred microprocessor 31 are used to communicate with all of the peripherals devices. Port "A" is a parallel interface which includes sixteen output address lines and twenty-four bi-directional data lines for communicating with a read-only memory ("ROM") 47 (used to store the microprocessor's sequenced instructions, or software), a random-access memory ("RAM") 49 (used by the microprocessor for data storage) and the display device 45, which displays bin and threshold settings for the rotary shaft encoder box 35. Thus, port "A" is used by the microprocessor to retrieve its sequential operating instructions from ROM 47, to communicate with RAM 49 for storing and retrieving data, and to output parallel data to the peripheral display device.

Port "B" is a host interface port that is typically used in other applications to receive instructions from a main system microprocessor, but since the microprocessor 31 is not here employed as a co-processor, port "B" is programmed for use as a second parallel data port and receives data from the rotary shaft encoder box 35.

Port "C" comprises two serial interfaces, one for handling RS-232 type communications, and a second for handling synchronous communications. The first serial interface is a serial communications interface (labelled "SCI" in FIG. 2) and provides a communications link (via an RS-422 coupling) for the remote fader board 27. This interface utilizes only two lines for asynchronous communication from the microprocessor 31 to the remote fader board 27 (not used in current software), and periodic communication from the remote fader board 27 to the microprocessor 31 (which operates as slave) that identifies the position of each of eight faders. The second serial interface (labelled "SSI" in FIG. 2) is used for synchronous audio input and output data transmissions between the microprocessor 31 and "ProPort Model 656" device 43.

The Shaft Encoder Interface and Port "B"

In the preferred embodiment, port "B" is programmed by the microprocessor itself upon power-up for use as a fourteen-line parallel-data input, with a fifteenth line employed as a watchdog (an output from the microprocessor 31 used to ensure that the microprocessor is operating correctly). Specifically, the fourteen data lines are used to interface the rotary shaft encoder box 35 with the microprocessor 31, if the rotary shaft encoder box is in fact coupled to the mother board 33 for use as a user input. Six of the fourteen data lines provide switch signals to the microprocessor 31, respectively identifying functions of "up," "down," "remote," "solo," "bypass" and "freeze," discussed further below. Four of the data lines respectively provide phase information for the two rotary shaft encoder inputs, and interrupts for indicating movement of the corresponding shaft encoders 37 and 39. The remaining six lines are not used in the preferred embodiment.

The watchdog output of the microprocessor (identified as output "PB12" from the standpoint of microprocessor wiring and software) is strobed by the microprocessor at the end of each program loop. Should a predetermined quantity of time pass without a strobe signal appearing on the watchdog output, as monitored by a timing chip (not shown), a system reset is triggered.

A twenty-six pin parallel coupling 51 and a debounce circuit 53 physically link the data inputs from the rotary shaft encoder box 35 to port "B" of the microprocessor 31. The rotary shaft encoder box utilizes a pair of momentary contact switches (six switches are identified by the reference numeral 41 in FIG. 2), respectively providing "up" and "down" selection, for incrementing or decrementing a bin selection by the user as displayed by a first pair 55 of light-emitting diode ("LED") displays of the display device 45. In other words, to adjust a contribution-threshold setting, the user selects a bin by viewing the first pair of displays 55 and using the "up" and "down" buttons on the rotary shaft encoder box 35 to select a particular group of eight frequency bins. Having selected a group, the user then utilizes the first rotary shaft encoder 37 to vary the contribution-thresholds as displayed by a second pair 57 of LED displays of the display device 45. As indicated above, the second rotary shaft encoder 39 is connected to the twenty-six pin coupling (and thus to the microprocessor 31), but is not used in the preferred embodiment.

The remaining four of the six push-button switches 41 are selected to implement one of four additional functions, the status of these switches being stored and periodically by software. A "remote" function represented by the first of these additional switches is depressed to activate or deactivate the microprocessor's reliance upon the remote fader board 27, although the rotary shaft encoder box 35 is still monitored by the microprocessor. A "solo" switch is depressed to cause the microprocessor to derive a FIR that removes contributions from all bands other than the one corresponding to the selected frequency bin. In other words, if a particular frequency bin is selected, only the frequencies which correspond to the selected bin will be passed by the FIR according to the attenuation scheme described herein, and all other frequencies will be blocked. A "bypass" switch is used to deactivate the filter, such that all bands of the audio inputs corresponding to the motion picture soundtrack are passed without attenuation. Finally, a "freeze" switch is used to lock current FIR coefficients, such that new coefficients do not override FIR coefficients from a previous data sampling. A repeated depressing of any of these four switches will toggle a current state of the button. Preferably, the "solo," "bypass" and "freeze" functions are exclusive, and so may alternatively may be implemented by use of a single four-state switch. Notably, debounce for these six switches 41 is provided by a MOTOROLA "14490" logic chip, by the time taken to complete a program loop, and by a software-implemented exclusive-or function that registers only "1" to "0" transitions of the "up" and "down" switches.

The Display Device 45 and Port "A"

As mentioned, port "A" of the microprocessor 31 includes a twenty-four bit data bus and a sixteen bit address bus that are used to communicate with ROM 47, RAM 49 and the display device 45. In addition, port "A" includes a number of other control bits which will be discussed below, including an active-low program memory select ("PS"), an active-low data memory select ("DS"), separate active-low read and write enables ("RD" and "WE"), and a X/Y memory select bit ("X/Y"), which corresponds to a division of RAM and ROM which is internal to the microprocessor 31 between "X" and "Y" memory banks.

The display device 45 consists of two pairs 55 and 57 of seven segment LED displays. Each individual LED display is chosen to have resident decoding and latching, such that from four binary inputs, the display may automatically configure a decimal display from 0 to 9. As mentioned, the first pair of displays 55 corresponds to a frequency bin group (displayed as 1, 3, 5, 7, 9, 11, 13 and 15 khz groups) which has been selected by the momentary contact switches ("up" and "down"). The second pair of LED displays 57 is used in the preferred embodiment to display contribution-threshold setting for a selected frequency bin group, the contribution-thresholds being altered by the first rotary shaft encoder 37 among ninety-six discrete levels.

Since individual LED display have four binary inputs, each pair has display information written by the microprocessor 31 by the eight least significant bits of the data bus to both displays of the display pairs simultaneously, as governed by a strobe line dedicated to each display pair. This strobe line is derived from address information of the microprocessor 31 by a "74LS138" logic chip 59, which is a 3-bit line decoder to eight strobe outputs. The "74LS138" logic chip is enabled in the preferred embodiment only when the most significant address line, "A15" is high and when the X/Y bit indicates that "Y" memory is selected by the microprocessor 31.

Port "A" as mentioned, is utilized not only to communicate with the display device 45, but also with memory resident on the mother board 33, including ROM 47 and RAM 49. Thus, it is necessary to buffer couplings of the data bus connections to peripherals to the mother board 33. To this end, two "74LS245" bi-directional octal buffers (collectively designated by the reference numeral 61 in FIG. 2) are used to provide a data bus output composed of the least sixteen bits of the twenty-four bit parallel data bus, with the directional input to the buffers having a jumper that is hardwired to provide for data output from the mother board only. The most significant address line "A15" and the "DS" bit are used as output enables, such that parallel data may be output to peripherals from port "A" only when the microprocessor attempts to write to the most significant 32 k of data address space, whether "X" or "Y" address space. Since the octal buffers 61 couple only the least significant eight bits of the data bus between the display device 45 and the microprocessor 31, and further, only does so when "Y" memory space is accessed by the microprocessor, expansion space is thereby reserved in the preferred embodiment to accommodate other potential peripheral input or output devices.

The connector between the mother board's port "A" and peripheral devices is a forty-pin connector 63 having two power lines, the lower sixteen lines of the microprocessor's twenty-four-line data bus, eight strobe lines from the 3-to-8 decoder 59, and two ground lines.

The preferred embodiment utilizes six chips of external RAM ("MCM6209" in the preferred embodiment, each chip storing 64k-4 bit memory), configured to hold data bits in parallel, and three external ROM chips ("AM27C64" in the preferred embodiment, each 8k-8 bit memory, also wired in parallel, to provide twenty-four bit instructions). Chip selection is accomplished by utilization of three bits of output of the microprocessor, including "A15" (the most significant address bit), "PS" (program memory select) and "DS" (data memory select). Thus, the ROM chips are enabled by use of the "PS" line, while the RAM chips are enabled by use of the "DS" line and the lowering of the "A15" line.

In addition to this external memory, the microprocessor 31 used in the preferred embodiment also has internal memory, including thirty-two words of internal bootstrap ROM, five-hundred and twelve words of program RAM, and two-hundred and fifty-six words of each "X" and "Y" internal RAM and internal ROM. Importantly, the internal "Y" ROM is factory-programmed to contain a sine wave table, which is utilized as described below. Thus, memory addresses $0000-$00FF for each of "X" and "Y" banks are reserved for RAM internal to the microprocessor, $0100-$01FF in the "Y" memory bank is reserved for the factory programmed sine wave data table, and addresses $0200-$7FFF in the "X" and "Y" memory banks are reserved for RAM external to the microprocessor, with remaining memory reserved for external peripherals and internal memory space allocated to interrupt functions ($FFC0-$FFFF). The microprocessor 31 distinguishes between internal and external memory through its use of the "RD" and "WE" outputs, which are used to enable peripherals located at addresses external to the microprocessor.

The Fader Serial Interface 64-port "C" (SCI)

Figure 3:
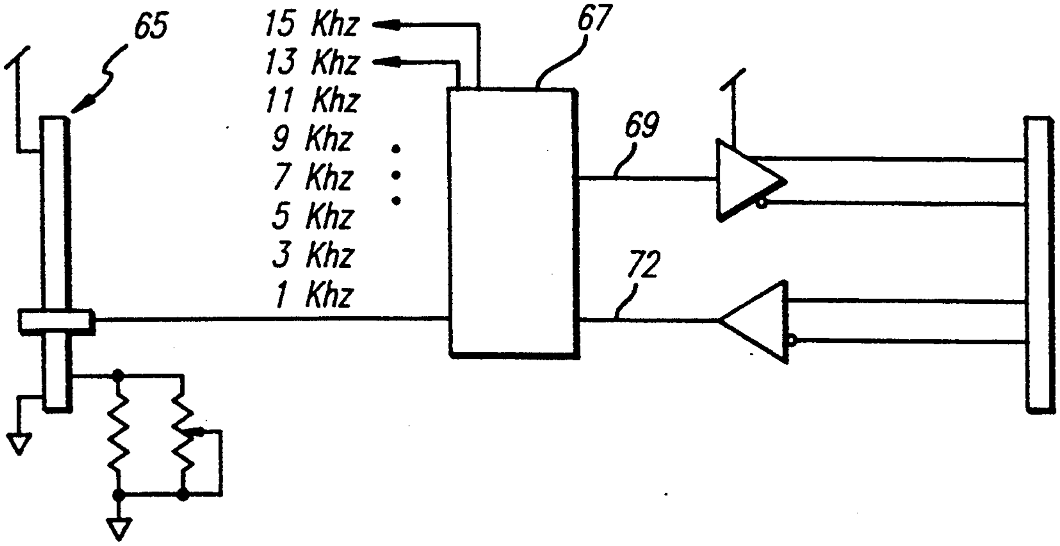
FIG. 3 is an illustrative diagram of the remote fader board shown in FIG. 2, illustrating a remote board microprocessor, a communications coupling for communicating with the microprocessor-based system of FIG. 2, and, for simplicity, only one of eight faders which are respectively coupled to 1, 3, 5, 7, 9, 11, 13 and 15 khz inputs to the remote board microprocessor; and, FIG. 4 is a block diagram similar to FIG. 1, but illustrates the operation of the preferred embodiment in somewhat greater detail than FIG. 1.

As indicated above, the remote fader board 27 is used instead of, or in addition to, the rotary shaft encoder box 35 to provide simultaneous user control over contribution-threshold settings. With reference to FIG. 3, the remote fader board 27 includes eight variable-resistance, sliding-bar faders 65 (although for drawing-simplicity, only one fader is illustrated), each controlling the contribution-thresholds for eight contiguous frequency bins. Thus, a first fader 65 controls frequency bin numbers 0–7, centered about 1 khz frequencies, as indicated, while other faders control frequency bins 8–15, 16–23, 24–31, 32–39, 40–47, 48–55 and 56–63, respectively centered about 3, 5, 7, 9, 11, 13 and 15 khz frequencies. Thus, as the user listens to the audio tracks of the film's soundtrack, the user may separately manipulate the eight faders (represented by the numeral 65 in FIG. 3) to produce an optimal noise reduction scheme in response to perceived unwanted noise.

Voltage outputs from each of the eight faders, which vary with the setting of each fader, are coupled to a parallel-data port of a remote board microprocessor 67. This microprocessor is chosen in the preferred embodiment to be a MOTOROLA "MC68HC805B6" microcontroller, having four eight-bit parallel data ports, a "D" port of which is programmable to become an eight-channel, chip-resident A/D converter, and a SCI port. Thus, the voltage outputs from each of the eight faders are coupled to port "D" of the remote board microprocessor 67, and are sequentially sampled, digitized, and stored in RAM internal to the remote board microprocessor. A serial transmit line 69 and serial receive 70 line couple the remote board microprocessor with the RS-422 connector for communications with the microprocessor 31 through a debounce circuit 71, and a 3.6864 megahertz clock is provided to time and support the operations of the remote board microprocessor 67.

The remote board microprocessor 67 independently transmits (approximately each 50 milliseconds) a frame of digital words to the microprocessor 31 that represents the position of each of the faders. Eight digital words, each a byte in length, are configured by the remote board microprocessor 67 as part of a nine-byte frame, 9600-baud, serial message to be sent to the mother board 33, which operates in slave mode. The ninth byte is always a carriage return signal, which indicates the end of the frame and serves as a flag signal to the microprocessor 31 to reset a software-defined pointer that identifies each of the eight words with a corresponding fader. The serial receive line 70 is not used, since the remote board microprocessor 67 features internal electronically erasable/programmable read only memory ("EPROM") which carries all of the information that the remote board microprocessor needs to scan the voltage outputs from the faders and format that information into a nine-byte message frame that ends with a carriage return signal.

THE SSI INTERFACE-AUDIO DATA INPUT/OUTPUT

The SSI interface of port "C" of the microprocessor 31 includes six serial transmission lines, ("SC0," "SC1," "SC2," "SCK," "SRD" and "STD") which, after passage through debounce circuitry 72, are coupled to the ARIEL "ProPort model 656" device 43 by a "DB-15" connector. Communication is synchronous and is composed of frames of two sixteen bit digital values, one representing the left audio channel and one representing the right audio channel. Accordingly, data transmitted from the "ProPort model 656" device 43 to the mother board 33 is input to the "SRD" pin of the microprocessor 31, accompanied by a 1.024 Mhz clock signal on the "SCK" line and a framing pulse on the "SC2" line. Output data from the microprocessor 31, representing the left and right audio output signals, is sent (according to the 1.024 Mhz clock signal supplied by the "ProPort model 656" device 43) in identical format to the digital input signals.

As seen in Appendix "A," receipt by the microprocessor 31 of a full frame of data from the "ProPort model 656" device 43 triggers an interrupt in program software, during which the microprocessor 31 abandons its normal program loop and writes the newly-received data into two sequential positions of a five-hundred and twelve position circular input buffer defined in "X" RAM. Simultaneously, the interrupt routine directs the microprocessor 31 to retrieve the oldest output data, which the microprocessor has already modified with the FIR filter and which is stored in two positions of a five-hundred and twelve position circular output buffer defined in "Y" RAM, and to output that data on the "STD" serial transmission line of the microprocessor. The "SC0" and "SC1" lines are not used in the preferred embodiment.

The ARIEL "ProPort model 656" device 43 is a remote serial port that features two resident A/D converters (designated by the reference numeral 15 in FIG. 1) for accepting two input signals and two resident D/A converters (designated by the reference numeral 21) for providing two output signals. This serial port accepts the two audio analog input signals and provides the two analog audio output signals from respective pairs of three-conductor ¼ inch phone jacks. Digital sampling is simultaneous, and the "ProPort model 656" device 43 configures the digital data into two-word per frame format mentioned above.

With this understanding of the configuration of the hardware of the preferred embodiment, the software will now be discussed in detail. However, those having specific questions are referred to the source code for the microprocessor 31, which is attached in the accompanying Appendix "A."

2. SOFTWARE THAT CONTROLS THE MICROPROCESSOR 31

Figure 4:
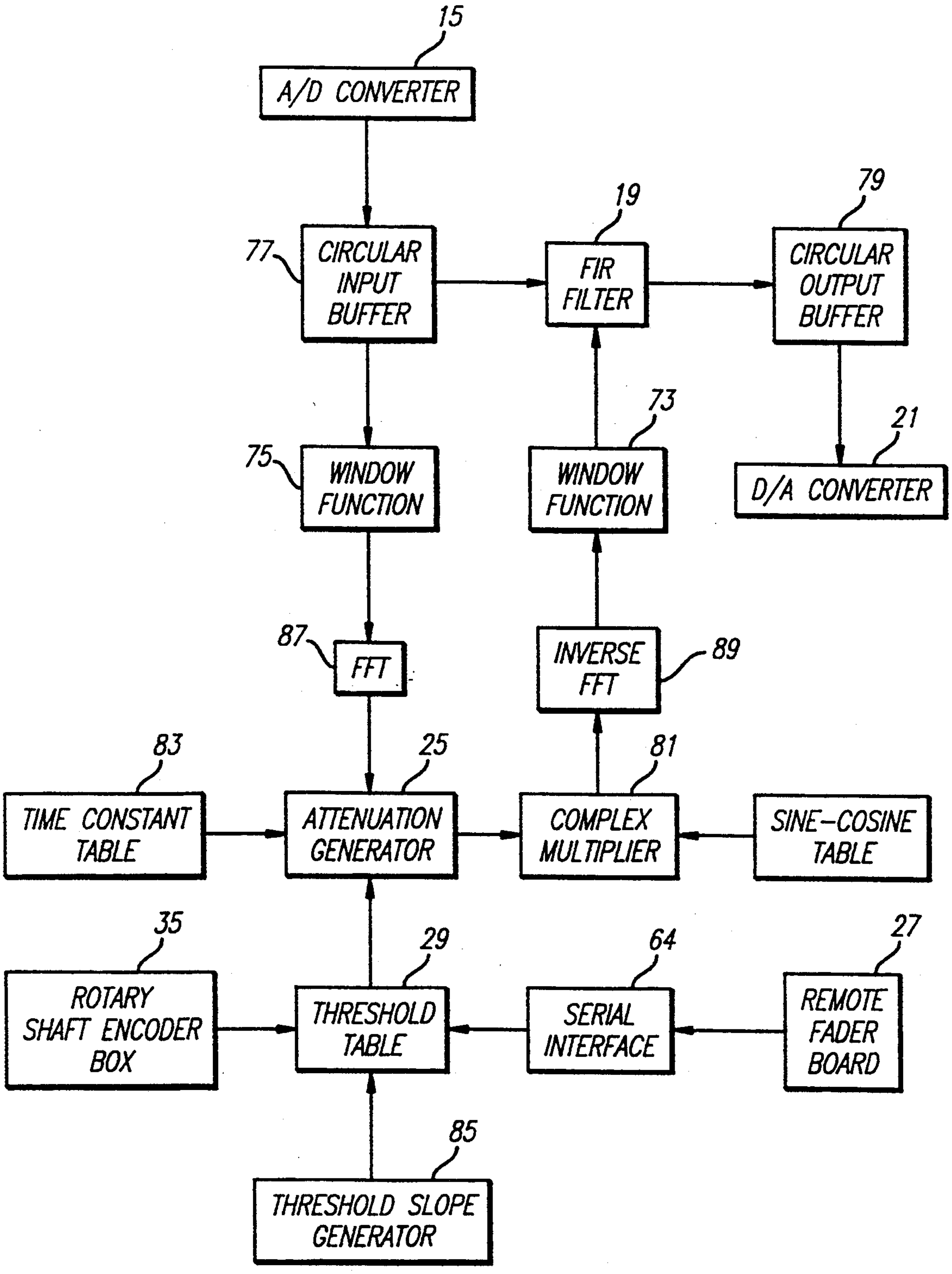

As observed in Appendix "A", the microprocessor 31 is upon power-up first directed to define the various tables and constants that will be used in the performance of the functions shown in FIG. 4. RAM allocation is shown at the top of the second page of Appendix "A." As mentioned above, the microprocessor 31 is programmed upon power-up such that the lower $1FF (512) memory positions in each of "X" and "Y" memory are reserved for memory internal to the microprocessor.

Prior to beginning the main program loop, the software is in an initialization mode which it utilizes to define program constants and set-up tables in RAM, and in addition, to define program interrupt vectors and operations registers that control the mode of operation of the microprocessor.

The interrupt routines are generally employed to process serial data as it is received by the microprocessor 31, to allow the microprocessor to operate in slave mode to some of its peripheral data inputs. For example, data received from the SSI interface of port "C" consists of sixteen bits of a left channel digital value and sixteen bits of right channel digital value. When the SSI interface triggers a program interrupt, indicating that it has received data, the microprocessor ceases its normal program functions and loads the received values into sequential memory slots of the 512 position circular input data buffer 77, with even slots identifying left channel digital values and odd slots identifying right channel digital values. Simultaneously, the microprocessor 31 loads the oldest output data from corresponding sequential memory slots of a 512 position output data buffer 79 to the SSI interface for transmission from the microprocessor. After updating its pointers into each buffer, the microprocessor 31 renews its ability to respond to interrupt routines and continues with its prior tasks.

Similarly, a program interrupt is triggered each time serial data is received by the SCI interface of port "C," and the microprocessor thereby directed to load a nine-position buffer with the nine words of the remote fader box transmission, which occurs approximately each 50 milliseconds. A similar interrupt is also triggered (externally to the microprocessor) when the rotary shaft encoder 37 is rotated, causing the microprocessor to store new contribution-threshold data for a frequency bin group which has been previously selected using the "up" and "down" switches, and which is concurrently displayed by the first pair 55 of LED displays.

With reference to Appendix "A," the remainder of the initial program phase is utilized to define constants and tables that will be used in the main program loop. A threshold value table is generated by a threshold slope generator 85. This table contains constants representing 0–95 db attenuation, commencing with a factor of 1, each subsequent slot representing an incremental additional factor of −1 db (which is provided by an attenuation constant of 0.89125094). This table is used to generate the attenuation indices that, when selected by the comparison step between the user-settings of contribution-thresholds and actual frequency bin strength, are stored in registers defined in RAM and are transformed into the FIR filter coefficients through the IFFT process. A corresponding display table is created having 108 slots, the first 96 for LED display of the decimal numbers 00–95, and the remaining slots for LED display of frequency bin group indicia, namely the odd numbers 1, 3, 5, 7, 9, 11, 13 and 15 corresponding to the frequency ranges of the groups.

A window routine also creates a 127-point "filter window coefficient" table, which represents a fourth-order Blackman window function 73 which is employed to smooth the result of the IFFT in creating FIR coefficients, such that the FIR coefficients efficiently effect the desired attenuation for the desired frequency ranges only. A similar routine creates a 128-point "FFT window coefficient" table, which represents a third-order Blackman window function 75, which is employed to smooth the digital value sums, such that results of the FFT present data representing frequency contribution to the overall signal which do not have side-lobes that skew the computed frequency contributions of other frequency bins. In other words, FFT results corresponding to one frequency bin would otherwise affect the results of adjacent bins, and the window function substantially reduces the effect. These two windows are represented in software as $$\Sigma A - B.\cos(2\pi n/N) + C.\cos(4\pi n/N) - D.\cos(6\pi n/N)$$

where the constants A, B, C and D are defined separately for each window (D is zero for the three-term window), N represents the total number of points in the window, and the sum is taken for each nth point of the total number of points N.

In addition to creating the above-mentioned tables, the initial program phase also generates two sine/cosine tables for supplying sine and cosine value pairs for (1) a scaled complex multiplier 81 for the attenuation indices, such that pairs of values are generated as the operand for the IFFT, and for (2) the terms used in application of both of the FFT and the IFFT. As is observed in Appendix "A," one subroutine called "FFT" implements applies both the FFT and IFFT functions used to generate the FIR filter coefficients.

It has been found that if user-settings for contribution-thresholds are changed too rapidly for low-frequency bins, the audio output is denigrated. Thus, the preferred embodiment implements a time constant table 83 which is used to generate a weighted average for old FFT results and new FFT results. According to this weighting scheme, for low-frequency bins, old FFT results are heavily weighted (on the order of 97%) and newly obtained FFT results contribute little to change the previous attenuation index for the corresponding frequency bins. For high frequency bins, new and old FFT results each contribute approximately 50% to the averaged values. This procedure is implemented in software by generating the time constant table 83 by beginning with a low sine value as the new FFT value scalar, and subtracting that scalar from "1" to obtain the corresponding old FFT value scalar, thereafter saving the scalar pair thus computed into four parallel "Y" and "X" memory slots, respectively, for four frequency bins. The sine value is then incremented by changing a pointer to the sine wave ROM to obtain a new, large sine value. Sixteen groups of four time constant scalar pairs are thereby created, with the last group featuring scalars which are approximately equal to each other in magnitude, corresponding to the 15–16 khz frequency range.

Once these tables have been defined, the main program loop is entered and the interrupts are unmasked, allowing the microprocessor 31 to fill the 512 position circular input buffer. As mentioned above, the 30.0 megahertz clock used to support the microprocessor 31 is just fast enough to permit the microprocessor to complete the main program loop. Consequently, the first task of the main program loop is application of the FIR filter to generate two pairs of 128 digitized output values for each of the left and right audio output signals.

The microprocessor takes the oldest 127 digital values, for each audio input signal, and multiplies those values by the corresponding 127 FIR filter coefficients, summing the results to obtain an output value, which is loaded into the circular output buffer 79. The microprocessor then computes 127 more output values for each of the left and right channels, by incrementing the first value looked to in the circular input buffer 77 for use in the convolution, taking the following 126 samples, multiplying those 127 samples, respectively, by the same 127 FIR filter coefficients, and summing the results to obtain successive digital values of the output signals.

Once the convolution process is complete, the microprocessor 31 once again looks to the input values, this time to the 128 most recently received digital values of each channel to derive and update the FIR filter coefficients. First, the left and right digital values of the input signal (which were simultaneously generated) are averaged together and windowed by the three-term Blackman window function 75. These results are saved in an FFT data buffer as "real" terms, with corresponding "imaginary" terms set to zero, and once this has been done for all 128 samples, the FFT subroutine is called. The return from this subroutine (represented by the reference numeral 87 in FIG. 4) leaves a symmetric 128 term result, each term having both real and imaginary FFT values, in the same FFT data buffer. Since the result is symmetric, only the lower sixty-four terms are used for computation, and correspond to the sixty-four frequency bins, which each represent increments of 250 hz from 0 to 16 khz.

If the "freeze" function, mentioned above, has not been selected by the user, the results of the FFT are averaged-with old FFT results according to the weighting scheme which has been implemented in the time constant table 83, mentioned above. The averaged results (for each of the real and imaginary values) are then written into memory in a table over the old FFT results, for use in comparison with the contribution-thresholds for each frequency bin, and for use in the subsequent program loop as old FFT results.

It has been found that the end points of the 128-term FFT value have only real values, whereas the contribution of frequencies represented by the middle 126 terms are best represented by their corresponding imaginary values. Consequently, the averaged real value corresponding to the lowest frequency bin is compared with the lowest contribution-threshold, as it is stored in registers defined in RAM (the user-defined threshold table 29), and an appropriate attenuation index from the threshold value table, mentioned above, is stored in an intermediate filter mask table. For the remaining sixty-three frequency bins, the corresponding FFT averaged imaginary value is used for the comparison, with the attenuation indices also stored in the intermediate filter mask table.

Once the attenuation indices have been computed, the scaled complex multiplier table 81 is utilized to scale the attenuation indices and to create corresponding real (cosine) and imaginary (sine) values. These values are again loaded into the FFT data buffer for the IFFT step, designated by the reference numeral 89 in FIG. 4. The same FFT subroutine is called, and generates 128 coefficients, which are returned as "real" values in the FFT data buffer. These coefficients are applied to the four-term Blackman window function 73, and are written into a table that stores the FIR coefficients. The main program loop is recommenced after the microprocessor 31 strobes its watchdog output ("PB12"), which would otherwise cause a system reset, and executes a test switch subroutine, discussed below.

The FFT Subroutine

As mentioned, the FFT subroutine performs both the FFT and IFFT functions 87 and 89, using 128 real and imaginary value pairs as an operand and creating 128 real and imaginary value pairs as a result. The FFT subroutine, as seen in Appendix "A," takes a decimation in time computational shortcut, breaks up the computation generally by factors of 2 and performs several stages (or groups) of "butterfly" computations in a series of three nested loops. As mentioned earlier, since the 30.0 megahertz clock which supports the microprocessor 31 leaves only just enough time to process input values and provide output values at 32 khz, it is important to minimize program time, and therefore computational shortcuts, such as the use of "butterfly" computations, are important to the operation of the preferred embodiment. Alternatively, a faster clock could be used and greater length FFT algorithm implemented.

Test Switch Subroutine

Prior to restart of the main program loop, the test switch subroutine reads the six push-button switches 41 from the rotary shaft encoder box 35 to update the state of each of the corresponding six functions in software. First, the "up" and "down" switches are read to determine which frequency bin group the user has most recently selected. If the "remote" function is active, the subroutine reads fader position from RAM buffers which have been loaded (via one of the interrupt routines mentioned earlier) from the remote fader board 27. Fader position, represented by $00-$FF in hex, is converted to $00-$5F to correspond to the ninety-six contribution-threshold levels (and corresponding attenuation levels) used in the preferred embodiment. Whether or not the "remote" function is active, the microprocessor 31 directs the display device 45 to display the current frequency bin group selection (1, 3, 5, 7, 9, 11, 13 or 15 khz) and the current contribution-threshold, as stored in a corresponding register in the user-defined threshold table 29 (and as altered by one of the shaft-encoder interrupt routine, mentioned above).

To avoid a sharp change in contribution-threshold between adjacent frequency bin groups, a threshold smoothing filter is applied, which, after converted fader position has been loaded into registers, smoothes the sharp change by adjusting the contribution-thresholds of the end frequency bins of each of the eight groups of eight frequency bins.

From the foregoing, it is apparent that various modifications to the preferred embodiment described herein will readily occur to those of skill in the art. Rather than using one microprocessor to perform both convolution and generation of filter coefficients, it is possible to use a second microprocessor, such as a microcontroller, to perform convolution, with filter coefficients being calculated and provided by a main microprocessor. Also, other frequency bin control schemes may be implemented, which for example, allow for independent control of each individual frequency bin. Numerous variations may be made in the particular software, attached below as Appendix "A," without departing from the scope of the invention.

Having thus described several exemplary embodiments of the invention, it will be apparent that various alterations, modifications, and improvements will readily occur to those skilled in the art. Such alter-ations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

APPENDICES

Appendix "A" is a source code listing for the preferred embodiment, and in particular, is written for the MOTOROLA "XSP56001RC33" microprocessor. The source code listing generally includes interrupt routines, triggered by receipt of SSI data, SCI data, and sensed rotation of rotary encoder shafts 37 and 39, a main program loop, and subroutines that apply the fourier transform and that sense and update user-inputs, such as from the rotary encoder shaft box 35 and the remote fader control board 27.

```
                        ;
                        ;       05-29-92       version 1.8c
                        ;
                        ;SCI port uses new serial driver.
                        ;remote switches not enabled yet.
                        ;bug in stereo mode FIXED!!!
                        ;configured for 2.0Hz band control.
                        ;SSI is programmed to interface to a DSP-port (Ariel ProPort).
                        ;Configuration is Stereo!!!
                        ;SCI baud rate divider set for 9600 with 30.0MHz osc.

      000040            START     equ   $0040              ;program start address
      00FFFF            IPR       equ   $ffff              ;interupt priority
      00FFFE            BCR       equ   $fffe              ;bus control reg
      00FFF4            SRX       equ   $fff4              ;SCI receive data
      00FFF4            STX       equ   $fff4              ;SCI transmit data
      00FFF2            SCCR      equ   $fff2              ;SCI clock control register
      00FFF1            SSR       equ   $fff1              ;SCI status register
      00FFF0            SCR       equ   $fff0              ;SCI control register
      00FFE1            PCC       equ   $ffe1              ;port C control
      00FFE2            PBDDR     equ   $ffe2              ;PORT B data direction
      00FFE3            PCDDR     equ   $ffe3              ;PORT C data direction
      00FFE4            PBD       equ   $ffe4              ;port B data
      00FFE5            PCD       equ   $ffe5              ;port C data
      00FFEC            CRA       equ   $ffec              ;SSI control reg A
      00FFED            CRB       equ   $ffed              ;SSI control reg B
      00FFEE            SSISR     equ   $ffee              ;SSI control Status reg
      00FFEF            TX        equ   $ffef              ;SSI transmit reg
      00FFEF            RX        equ   $ffef              ;SSI receive  reg
      000007            Beep      equ   $7                 ;beep
      00000D            CR        equ   $d                 ;carriage return
      00002E            save_r    equ   $2e                ;address reg temp storage
      00002F            save_m    equ   $2f                ;modifier reg temp storage
      000030            enc_p     equ   $30                ;encoder position
      000032            t_db      equ   $32                ;attenuation constant
      000033            mush_c    equ   $33                ;mush constant
      000034            L_sw      equ   $34                ;local switch settings
      000035            r_sw      equ   $35                ;remote switch settings
      000036            pbs       equ   $36                ;port B state
      000037            sw_p      equ   $37                ;switch position
      000038            F_COSVAR  equ   $38                ;cosine variables for window coef
      00003C            T_COSVAR  equ   $3c                ;cosine variables for window coef
      000800            IOB       equ   $800               ;I/O data buffer base address
      000200            IOS       equ   512                ;I/O buffer size (4*points)
      000000            F_coef    equ   $00                ;filter coef table address
      000000            s_data    equ   $00                ;serial data buffer
      000040            MSK       equ   $40                ;filter data mask          (x)
      00007F            NTAPS     equ   127                ;number of filter taps
      000080            points    equ   128                ;size of FFT
      000080            data      equ   $80                ;location of FFT data buffer
      000300            coef      equ   $300               ;location of FFT coef table
      000340            TC        equ   $340               ;time constant data table   (x,y)
      000380            SCOS      equ   $380               ;sin-cos table for filter mask
      000400            AVG       equ   $400               ;averaged FFT data table    (x)
      000400            THLD      equ   $400               ;threshold data table       (y)
      000440            solo      equ   $440               ;*solo mask table  (x)
      000450            I_THLD    equ   $450               ;intermediate threshold data  (y)
      000500            F_window  equ   $500               ;filter window base address
      000580            T_window  equ   $580               ;transform window base address
      000700            T_VAL     equ   $700               ;threshold value table      (x)
      000760            B_NUM     equ   $760               ;bin number table (x), aka T_NDEX
      00FFC0            T_DISP    equ   $ffc0              ;threshold display port
      00FFC8            B_DISP    equ   $ffc8              ;bin display port

                        ;               X MEMORY                Y MEMORY
                        ;
                        ;$00-3f         constants/SCI           filter coef
                        ;$40-7f         filter mask table       filter coef
                        ;$80-ff         FFT real                FFT img.
                        ;$100-1ff                               sinewave table  (data rom)
                        ;$300-33f       -real cos table         -img sine table
                        ;$340-37f       tc data table (old)     time constant data table (new)
                        ;$380-3ff       real cos table          img sine table   (scaled)
                        ;$400-43f       average FFT data        threshold data table
                        ;$440-48f       solo mask table         intermediate threshold data
                        ;$500-57e       F_window coef
                        ;$580-5ff                               T_window coef
                        ;$700-75f       T_VAL table             T_DISP table
                        ;$760-767       B_NUM table             B_DISP table
                        ;$800-9ff       input data buffer       output data buffer

                        ;SET INTERRUPT VECTORS
      P:0000                      org    P:$0000                ;set reset vector
      P:0000 0C0040               jmp    START
```

```
P:0008                org    P:$0008                         ;set IRQA vector
P:0008 0BF080         jsr    ENC_A
       000158

P:000C                org    P:$000c
P:000C 0867AF         movep         x:RX,x:(r7)              ;SSI receive fast interupt
P:000D 08DFEF         movep         y:(r7)+,x:TX
P:000E 0867AF         movep         x:RX,x:(r7)              ;SSI receive fast interupt w/error
P:000F 08DFEF         movep         y:(r7)+,x:TX

P:0014                org    P:$0014
P:0014 0863B4         movep         x:SRX,x:(r3)             ;store character in buffer
P:0015 08DBB4         movep         x:(r3)+,x:STX            ;echo character, update pointer
P:0016 0863B1         movep         x:SSR,x:(r3)             ;SCI receive fast w/error
P:0017 0863B4         movep         x:SRX,x:(r3)
P:0018 000000         nop                                    ;SCI transmit interupt
P:0019 000000         nop
P:001A 000000         nop                                    ;SCI idle line
P:001B 000000         nop

               ;initialize program constants for x memory
P:0030                org    p:$30
P:0030                dc     0                               ; shaft encoder A current pos
P:0031                dc     0                               ;
P:0032                dc     .89125094                       ; 1 db attenuation constant
P:0033                dc     .14285714                       ; mush constant
P:0034                dc     0                               ; local switch settings
P:0035                dc     0                               ; remote switch settings
P:0036                dc     0                               ; old port B state
P:0037                dc     B_NUM                           ; current switch position
P:0038                dc     .42                             ; A F_window cosine constants
P:0039                dc     .5                              ; B
P:003A                dc     .08                             ; C
P:003B                dc     0                               ; D
P:003C                dc     .42*.0625                       ; A T_window cosine constants
P:003D                dc     .5*.0625                        ; B
P:003E                dc     .08*.0625                       ; C
P:003F                dc     0                               ; D

               ; -1db = .89125094

               ; 1/7  = .14285714

               ;PROGRAM START
P:0040                org    P:START
P:0040 0003F8         ori    #$03,MR                         ;mask interupts
P:0041 0004FA         ori    #$04,OMR                        ;enable data rom
P:0042 300013         clr    a              #0,r0
P:0043 0600AA         rep    #$a00
P:0044 485800         move                  a,l:(r0)-        ;clear x and y memory

               ;INITIALIZE PERIPHERAL DEVICES
P:0045 08F4BF         movep                 #$7005,x:IPR     ;interupt priority level
       007005
P:0047 08F4BE         movep                 #$0004,x:BCR     ;set bus ctrl reg to 4 wait for I/O
       000004
P:0049 08F4B2         movep                 #$0031,x:SCCR    ;set sci clock control
       000031
P:004B 08F4B0         movep                 #$0b02,x:SCR     ;set sci control
       000B02
P:004D 08F4AC         movep                 #$4100,x:CRA     ;set SSI word length to 16 bits
       004100
P:004F 08F4AD         movep                 #$ba00,x:CRB     ;set sync mode, enable receive int.
       00BA00
P:0051 08F4A2         movep                 #$0800,x:PBDDR   ;set bit 12 to output (Gretsky)
       000800
P:0053 08F4A1         movep                 #$01fb,x:PCC     ;turn on SSI port
       0001FB

               ;SETUP I/O BUFFERS
P:0055 050CA3         move                  #$0c,m3          ;set buffer size
P:0056 330000         move                  #s_data,r3       ;address of SCI receive buffer
P:0057 77F400         move                  #points*2,n7     ;set index to data buffer size
       000100
P:0059 05F427         move                  #IOS-1,m7        ;set buffer size
       0001FF
P:005B 67F400         move                  #IOB,r7          ;address of SSI I/O buffer
       000800

               ;LOAD CONSTANTS
P:005D 303000         move                  #$30,r0          ;data pointer
P:005E 061080         do     #$10,initx
       000061
P:0060 07E084         movem                 p:(r0),x0        ;move from program memory
P:0061 445800         move                  x0,x:(r0)+       ;to x memory
               initx

               ;Setup parameter tables for user interface
               ; ie. shaft encoder and switch values.
               ;
               ;CREATE T_VAL TABLE
P:0062 64F400         move                  #T_VAL+95,r4     ;set top of T_VAL table
       00075F
P:0064 2E4000         move                  #$40,a           ;set 'a' to 0.5
P:0065 47B232         asl    a              x:t_db,y1        ;set attenuation constant
P:0066 066080         do     #96,mkt_val
       000069
P:0068 181400         move                  a,x:(r4)-   a,y0
P:0069 2000B1         mpyr   y0,y1,a
               mkt_val

               ;INITIALIZE DISPLAY TABLE
P:006A 60F400         move                  #T_VAL,r0        ;data destination
       000700
```

```
         P:006C 64F400          move          #$1dc,r4                 ;start of disp table
                0001DC
         P:006E 062480          do      #36,init_disp                  ;THLD=32, BIN=4
                000077
         P:0070 07DC8E          movem         p:(r4)+,a                ;get display data from p memory
         P:0071 5C5800          move                      a1,y:(r0)+   ;load y memory (display data)
         P:0072 0608A0          rep     #8
         P:0073 200023          lsr     a
         P:0074 5C5800          move                      a1,y:(r0)+   ;load y memory (display data)
         P:0075 0608A0          rep     #8
         P:0076 200023          lsr     a
         P:0077 5C5800          move                      a1,y:(r0)+   ;load y memory (display data)
                         init_disp


                         ;CREATE FILTER WINDOW COEFFICIENTS
                         ;
         P:0078 60F400          move          #F_window,r0             ;filter window coef
                000500
         P:007A 313800          move          #F_COSVAR,r1             ;filter cosine variables
         P:007B 0502A1          move          #2,m1                    ;modulo for cosine variables
         P:007C 3C0200          move          #2,n4
         P:007D 05FFA4          move          #$ff,m4
         P:007E 64F400          move          #$142,r4                 ;B COS start address
                000142
         P:0080 3D0400          move          #4,n5
         P:0081 05FFA5          move          #$ff,m5
         P:0082 65F400          move          #$144,r5                 ;C COS start address
                000144
         P:0084 56D900          move          x:(r1)+,a                ;get first variable
         P:0085 D09900          move          x:(r1)+,x0  y:(r4)-n4,y0 ;get second variable and COSINE
         P:0086 067F80          do      #127,WNDW                      ;make 127 window coefficients
                00008B
         P:0088 D0B9D6          mac     -x0,y0,a  x:(r1)+,x0  y:(r5)+n5,y0 ;-B COS(2pi*n/N)
         P:0089 D099D3          macr    x0,y0,a   x:(r1)+,x0  y:(r4)-n4,y0 ;+C COS(2pi*2n/N)
         P:008A 081800          move          a,x:(r0)+   x0,a
         P:008B 44D900          move          x:(r1)+,x0
                         WNDW



                         ;CREATE FFT WINDOW COEFFICIENTS
                         ;___ setup conditions ___
                         ;m1 must be preset to #2
                         ;n4 must be preset to #2
                         ;n5 must be preset to #4
                         ;m4,m5 must be preset to #$ff
         P:008C 60F400          move          #T_window,r0             ;FFT window coef
                000580
         P:008E 313C00          move          #T_COSVAR,r1             ;FFT cosine variables
         P:008F 64F400          move          #$140,r4                 ;B COS start address
                000140
         P:0091 229500          move          r4,r5                    ;C COS start address
         P:0092 56D900          move          x:(r1)+,a                ;get first variable
         P:0093 D09900          move          x:(r1)+,x0  y:(r4)-n4,y0 ;get second variable and COSINE
         P:0094 068080          do      #128,WNDW1                     ;make 128 window coefficients
                00009A
         P:0096 D0B9D6          mac     -x0,y0,a  x:(r1)+,x0  y:(r5)-n5,y0 ;-B COS(2pi*n/N)
         P:0097 D099D3          macr    x0,y0,a   x:(r1)+,x0  y:(r4)-n4,y0 ;+C COS(2pi*2n/N)
         P:0098 5E5800          move                      a,y:(r0)+
         P:0099 208E00          move          x0,a
         P:009A 44D900          move          x:(r1)+,x0
                         WNDW1



                         ;CREATE SINE-COSINE TABLE FOR FILTER MASK
                         ;___ setup conditions ___
                         ;m4,m5 must be preset to #$ff
                         ;n4 must be preset to #2
         P:009B 60F400          move          #SCOS,r0
                000380
         P:009D 64F400          move          #$140,r4                 ;cosine table start
                000140
         P:009F 65F400          move          #$100,r5                 ;sine table start
                000100
         P:00A1 270100          move          #01,y1                   ;set scale factor
         P:00A2 239D00          move          n4,n5
         P:00A3 4ECC00          move                      y:(r4)+n4,y0 ;get first cosine value
         P:00A4 064080          do      #64,SCOS_LOOP
                0000AB
         P:00A6 4ECDB1          mpyr    y0,y1,a               y:(r5)+n5,y0
         P:00A7 D800BD          mpyr    -y0,y1,b  a,x:(r0)    y:(r4)+n4,y0
         P:00A8 5F5800          move                          b,y:(r0)+
         P:00A9 4ECDB5          mpyr    -y0,y1,a              y:(r5)+n5,y0
         P:00AA D800B9          mpyr    y0,y1,b   a,x:(r0)    y:(r4)+n4,y0
         P:00AB 5F5800          move                          b,y:(r0)+
                         SCOS_LOOP

                         ;CREATE SINE-COSINE TABLE FOR FFT TWIDDLES
                         ;___ setup conditions ___
                         ;m4,m5 must be preset to #$ff
                         ;n4,n5 must be preset to #2
         P:00AC 64F400          move          #$1c0,r4
                0001C0
         P:00AE 65F400          move          #$180,r5
                000180
         P:00B0 60F400          move          #coef,r0
                000300
         P:00B2 064080          do      #64,coef_loop
                0000B6
         P:00B4 5ECC00          move                          y:(r4)+n4,a
         P:00B5 5FCD00          move                          y:(r5)+n5,b
         P:00B6 4A5800          move          ab,l:(r0)+
                         coef_loop
```

```
                             ;CREATE TIME CONSTANT TABLE
                             ;___ setup conditions ___
                             ;m0,m4 must be greater than #$3f
P:00B7 60F400                move             #TC,r0                          ;set start of TC table
       000340
P:00B9 64F400                move             #$181,r4                        ;set start of sine table
       000181
P:00BB 061080                do        #16,TCT
       0000C1
P:00BD 2E4000                move             #$40,a                          ;set 'a' to 0.5
P:00BE 5FDC32                asl       a                       y:(r4)-,b      ;get value from sine table
P:00BF 200014                sub       b,a                                    ;make inverse
P:00C0 0604A0                rep       #4
P:00C1 4A5800                move             ab,l:(r0)+                      ;store in TC table
                      TCT

                             ;end of setup

P:00C2 00FCB8                andi      #$fc,MR                                ;unmask all interupts

                             ;Begin main program loop...

P:00C3 340000         LOOP1  move             #F_coef,r4                      ;coef base address
P:00C4 05F420                move             #IOS-1,m0                       ;set data buffer modulo size
       0001FF
P:00C6 05FFA1                move             #(IOS/2)-1,m1                   ;set  mask value
P:00C7 057EA4                move             #NTAPS-1,m4                     ;set coef buffer modulo size
P:00C8 38FC00                move             #(NTAPS*2)-2,n0                 ;set index to NTAPS
P:00C9 0447A1                move             m1,y1                           ;move mask value to y1
P:00CA 22EE00         LOOP2  move             r7,a                            ;**assending order**
P:00CB 200076                and       y1,a                                   ;check for I/O block boundry
P:00CC 0E20CA                jne       LOOP2
P:00CD 0AAE83                jclr      #3,x:SSISR,sync                        ;sync right channel on odd addr.
       0000D0
P:00CF 205700                move             (r7)-
P:00D0 044F10         sync   lua       (r7)+n7,r0                             ;compute address of data buffer
P:00D1 044F11                lua       (r7)+n7,r1

                             ;Block mode FIR filter

P:00D2 204013                clr       a      (r0)-n0
P:00D3 068080                do        #points,FIR
       0000DD
P:00D5 F0981B                clr       b      x:(r0)+,x0  y:(r4)+,y0          ;get first state and coef
P:00D6 067E80                do        #NTAPS-1,s_mac
       0000D9
P:00D8 44D8D2                mac       x0,y0,a  x:(r0)+,x0                    ;do multiply-accumulate, left
P:00D9 F098DA                mac       x0,y0,b  x:(r0)+,x0  y:(r4)+,y0        ;do multiply-accumulate, right
                      s_mac
P:00DA 44D8D3                macr      x0,y0,a  x:(r0)+,x0                    ;do last mac, left
P:00DB 5E58DB                macr      x0,y0,b              a,y:(r0)+         ;do last mac right, output left
P:00DC 5F5813                clr       a                    b,y:(r0)+         ;move right to output buffer
P:00DD 204000                move             (r0)-n0                         ;reset input pointer
                      FIR

P:00DE 35801B                clr       b      #data,r5                        ;FFT data buffer base add.
P:00DF 64F400                move             #T_window,r4                    ;FFT window coef address
       000580
P:00E1 057FA5                move             #points-1,m5                    ;set  FFT buffer modulo size
P:00E2 0464A5                move             m5,m4
P:00E3 068080                do        #points,t_wndw
       0000E8
P:00E5 F09900                move             x:(r1)+,x0  y:(r4)+,y0          ;get left chan and window coef
P:00E6 44D9D0                mpy       x0,y0,a  x:(r1)+,x0                    ;get  right channel
P:00E7 5F65D3                macr      x0,y0,a              b,y:(r5)          ;clear imaginary data
P:00E8 565D00                move             a,x:(r5)+                       ;store windowed L/R sum ...
                      t_wndw                                                  ;in real data
P:00E9 0BF080                jsr       FFT                                    ;do time to freq FFT
       000131
P:00EB 0AA4A5                jset      #5,x:PBD,MKFLTR                        ;disable filter coef update
       000105
                                                                              ;aka freeze

                             ;
                             ; **** NOISE GATE ****
                             ;___ setup conditions ___
                             ;m6 must be preset to reverse carry addressing
                             ;m0,m2,m4,m5 must be preset to linear addressing
P:00ED 368000                move             #data,r6                        ;FFT result
P:00EE 3E4000                move             #points/2,n6
P:00EF 60F400                move             #AVG,r0                         ;average data table base add.
       000400
P:00F1 324000                move             #MSK,r2                         ;set output buffer
P:00F2 64F400                move             #THLD,r4                        ;threshold table base address
       000400
P:00F4 65F400                move             #TC,r5                          ;time constant table address
       000340
P:00F6 57CE00                move             x:(r6)+n6,b                     ;get real new data

                             ;Do Average of FFT data and Noise Gate
P:00F7 064080                do        #points/2,GATE
       000104
P:00F9 56E02E                abs       b      x:(r0),a                        ;abs new data, get old data
P:00FA 20002A                asr       b                                      ;scale new data
P:00FB 200002                addr      b,a                                    ;scale old data and add to new
P:00FC F81800                move             a,x:(r0)+   y:(r4)+,y0          ;output AVE,  load THLD
P:00FD 0618A0                rep       #$18
P:00FE 018050                div       y0,a
P:00FF 200050                add       y0,a
P:0100 210600                move             a0,y0                           ;y0 holds result of division

                             ;Do time constant scaling
                             ;new data in y0, old data in x0
P:0101 C1A200                move             x:(r2),x0   y:(r5),y1           ;get old data (x) & new time constant
```

```
        P:0102 45DDB8            mpy    y0,y1,b   x:(r5)+,x1                 ;scale new data & get old time consta
        P:0103 2000AB            macr   x0,x1,b                              ;scale old data
        P:0104 DF5A00            move             b,x:(r2)+    y:(r6)-n6,b   ;update mask table & get new img. dat
                         GATE


                         ;Make New Filter Coeficeints
                         ;set frequency coef. to '1'
        P:0105 304013    MKFLTR  clr    a         #MSK,r0                    ;filter mask table
        P:0106 61F417            not    a         #SCOS,r1                   ;scaled sine-cosine table
               000380
        P:0108 348022            asr    a         #data,r4                   ;FFT data buffer
        P:0109 053FA0            move             #(points/2)-1,m0           ;mask modulo is 1/2 of...
        P:010A 057FA1            move             #(points-1),m1             ;SCOS modulo and...
        P:010B 0464A1            move             m1,m4                      ;data modulo

        P:010C 0AA484            jclr   #4,x:PBD,F_MASK                      ;local  bypass switch
               000110
        P:010E 0640A0            rep    #(points/2)
        P:010F 565800            move             a,x:(r0)+                  ;set filter mask to unity

                         ;mpy mask with sin-cos table
                         ;move to FFT data buffer
        P:0110 44D800    F_MASK  move             x:(r0)+,x0                 ;get mask
        P:0111 4EE100            move                          y:(r1),y0     ;get img.
        P:0112 063F80            do     #(points/2)-1,MASK1
               000116
        P:0114 46D9D9            mpyr   x0,y0,b   x:(r1)+,y0                 ;get real
        P:0115 8398D1            mpyr   x0,y0,a   x:(r0)+,x0   b,y:(r4)      ;get mask, output img.
        P:0116 C83C00            move             a,x:(r4)+    y:(r1),y0     ;output real, get img.
                         MASK1
        P:0117 46D9D9            mpyr   x0,y0,b   x:(r1)+,y0                 ;get real
        P:0118 8790D1            mpyr   x0,y0,a   x:(r0)-,x1   b,y:(r4)      ;r0- (update only), output img.
        P:0119 C83C00            move             a,x:(r4)+    y:(r1),y0     ;output real, get img.
        P:011A 064080            do     #(points/2),MASK2
               00011E
        P:011C 46D9D9            mpyr   x0,y0,b   x:(r1)+,y0                 ;get real
        P:011D 8390D1            mpyr   x0,y0,a   x:(r0)-,x0   b,y:(r4)      ;get mask, output img.
        P:011E C83C00            move             a,x:(r4)+    y:(r1),y0     ;output real, get img.
                         MASK2
        P:011F 0BF080            jsr    FFT                                  ;do  freq to time FFT
               000131

                         ;CREATE FILTER COEF TABLE
                         ;WINDOW FFT OUTPUT
                         ;___ setup conditions ___
                         ;m0,m1 must be preset to linear addressing
                         ;m6 must be preset to reverse carry addressing
        P:0121 368000            move             #data,r6                   ;FFT data output
        P:0122 3E4000            move             #points/2,n6
        P:0123 300000            move             #F_coef,r0                 ;FIR coef table
        P:0124 61F400            move             #F_window,r1               ;filter window coef table
               000500
        P:0126 44CE00            move             x:(r6)+n6,x0               ;get first FFT output
        P:0127 45D900            move             x:(r1)+,x1                 ;get first window coef
        P:0128 067F80            do     #points-1,COPYCOEF
               00012B
        P:012A 45D9A9            mpyr   x0,x1,b   x:(r1)+,x1                 ;get next window coef
        P:012B 538E00            move             b,y:(r0)+    x:(r6)+n6,x0  ;get next FFT output
                         COPYCOEF

        P:012C 0BF080            jsr    TSW                                  ;jsr to test switch
               000165

        P:012E 0BA40C            bchg   #12,x:PBD                            ;Gretsky
        P:012F 22FB00            move             r7,n3
        P:0130 0C00C3            jmp    LOOP1

        P:0131 384013    FFT     clr    a         #points/2,n0               ;initialize butterflies per group
        P:0132 3E2017            not    a         #points/4,n6               ;initialize C pointer offset
        P:0133 3A0100            move             #1,n2                      ;initialize groups per pass
        P:0134 04CEA0            move             a,m0                       ;initialize A and B address modifiers
        P:0135 04CEA1            move             a,m1                       ;for linear addressing
        P:0136 04CEA4            move             a,m4
        P:0137 04CEA5            move             a,m5
        P:0138 0500A6            move             #0,m6                      ;initialize C address modifier for
                                                                             ;reverse carry (bit-reversed) address

                         ;Perform all FFT passes with triple nested DO loop

        P:0139 060780            do     #@cvi(@log(points)/@log(2)+0.5),_end_pass
               000156
        P:013B 308000            move             #data,r0                   ;initialize A input pointer
        P:013C 221400            move             r0,r4                      ;initialize A output pointer
        P:013D 044811            lua    (r0)+n0,r1                           ;initialize B input pointer
        P:013E 66F400            move             #coef,r6                   ;initialize C input pointer
               000300
        P:0140 045115            lua    (r1)-,r5                             ;initialize B output pointer
        P:0141 231900            move             n0,n1                      ;initialize pointer offsets
        P:0142 231C00            move             n0,n4
        P:0143 231D00            move             n0,n5

        P:0144 06DA00            do     n2,_end_grp
               000152
        P:0146 C4C100            move             x:(r1),x1    y:(r6),y0     ;lookup -sine and -cosine values
        P:0147 CB8500            move             x:(r5),a     y:(r0),b      ;preload data
        P:0148 44CE00            move             x:(r6)+n6,x0               ;update C pointer


        P:0149 06D800            do     n0,_end_bfy                          ;Radix 2 DIT butterfly kernel
               000150
        P:014B 4FD9EA            mac    x1,y0,b                y:(r1)+,y1
        P:014C CA1DCF            macr   -x0,y1,b  a,x:(r5)+    y:(r0),a
        P:014D 8F8016            subl   b,a       x:(r0),b     b,y:(r4)
```

```
P:014E 8AB8AE            mac    -x1,x0,b  x:(r0)+,a   a,y:(r5)
P:014F 45E1BF            macr   -y1,y0,b  x:(r1),x1
P:0150 CF1C16            subl   b,a       b,x:(r4)+   y:(r0),b
                _end_bfy
P:0151 D92D00            move             a,x:(r5)+n5 y:(r1)+n1,y1 ;update A and B pointers
P:0152 D58800            move             x:(r0)+n0,x1 y:(r4)+n4,y1
                _end_grp
P:0153 230D00            move             n0,b1
P:0154 234C2B            lsr    b         n2,a1                  ;divide butterflies per group by two
P:0155 21B833            lsl    a         b1,n0                  ;multiply groups per pass by two
P:0156 219A00            move             a1,n2
                _end_pass
P:0157 00000C            rts


                ;SHAFT ENCODER INTERUPT
P:0158 652E00   ENC_A    move             r5,x:save_r            ;save registers
P:0159 052F25            move             m5,x:save_m            ;  "     "
P:015A 055FA5            move             #95,m5                 ;encoder table size
P:015B 65B000            move             x:enc_p,r5             ;get current encoder position
P:015C 0AA4AD            jset   #13,x:PBD,UP_A                   ;test up/down bit
       000160
P:015E 205500            move             (r5)-                  ;update encoder position
P:015F 205500            move             (r5)-                  ;update encoder position again
P:0160 205D00   UP_A     move             (r5)+                  ;update encoder position one more tim
P:0161 653000            move             r5,x:enc_p             ;save updated position
P:0162 65AE00            move             x:save_r,r5            ;restore registers
P:0163 05AF25            move             x:save_m,m5            ;  "     "
P:0164 000004            rti

                ;TEST SWITCH SUBROUTINE
                ;___ setup conditions ___
                ;m0,m5 must be preset to linear addressing
P:0165 60F41B   TSW      clr    b         #T_VAL,r0
       000700
P:0167 64F41F            not    b         #B_NUM,r4
       000760
P:0169 65F42A            asr    b         #I_THLD,r5
       000450
P:016B 0507A1            move             #$07,m1                ;switch position modulo
P:016C 0464A1            move             m1,m4                  ;T_NDX modulo
P:016D 21E700            move             b,y1                   ;*
P:016E 56B600            move             x:pbs,a                ;get old port b state
P:016F 084524            movep            x:PBD,x1               ;get new port b state
P:0170 453663            eor    x1,a      x1,x:pbs               ;replace old with new
P:0171 61B766            and    x1,a      x:sw_p,r1              ;load old sw position
P:0172 0ACE20            jset   #0,a,INC                         ;"a" holds new sw closures
       000197
P:0174 0ACE21            jset   #1,a,DEC
       000199
P:0176 0AA4A2            jset   #2,x:PBD,wheaties                ;** serial port enabled **
       00019E

                ;update T_NDX from shaft encoder
P:0178 70B000            move             x:enc_p,n0             ;get current encoder pos.
P:0179 706100            move             n0,x:(r1)              ;update T_NDX for this bin

                ;update local display
P:017A 09E1C8   L_DISP   movep            y:(r1),y:B_DISP        ;B_NUM (y) to bin display
P:017B 09E8C0            movep            y:(r0+n0),y:T_DISP     ;T_VAL (y) to display

                ;make threshold table
P:017C 222400            move             r1,x0                  ;*
P:017D 060880            do     #8,fill
       000188
P:017F 228F00            move             r4,b                   ;*
P:0180 70DC00            move             x:(r4)+,n0             ;get next T_NDX
P:0181 000000            nop
P:0182 56E800            move             x:(r0+n0),a            ;get threshold value
P:0183 0AA483            jclr   #3,x:PBD,iso                     ;*
       000187
P:0185 20004D            cmp    x0,b                             ;*
P:0186 022070            tne    y1,a                             ;*
P:0187 0608A0   iso      rep    #8
P:0188 5E5D00            move                         a,y:(r5)+  ;fill threshold table
                fill

                ;Threshold smoothing filter
P:0189 60F400            move             #I_THLD+$42,r0
       000492
P:018B 65F400            move             #THLD+$3f,r5
       00043F
P:018D 46B300            move             x:mush_c,y0            ;get mush constant
P:018E 380600            move             #6,n0
P:018F 064080            do     #$40,mush
       000195
P:0191 4CD013            clr    a                     y:(r0)-,x0
P:0192 0606A0            rep    #6
P:0193 4CD0D2            mac    x0,y0,a               y:(r0)-,x0
P:0194 2048D3            macr   x0,y0,a   (r0)+n0
P:0195 5E5500            move                         a,y:(r5)-
                mush
P:0196 00000C            rts

                ;update switch position
P:0197 205900   INC      move             (r1)+                  ;increment switch position
P:0198 205900            move             (r1)+
P:0199 205100   DEC      move             (r1)-                  ;decrement switch position
P:019A 613700            move             r1,x:sw_p              ;save new sw position
P:019B 70E100            move             x:(r1),n0              ;get get T_NDX for this bin
P:019C 703000            move             n0,x:enc_p             ;update encoder position
P:019D 00000C            rts
```

```
                        ;Serial processor
                        ;___ setup conditions ___
                        ;r1 must be set to current switch position
                        ;r4 must be set to B_NUM

                        ;check for valid data block
P:019E 226E1B  wheaties clr     b         r3,a
P:019F 2D0900           move              #s_data+9,b1
P:01A0 200005           cmp     b,a
P:01A1 0AF0A9           jlt     under
       0001B7
P:01A3 0AF0A7           jgt     over
       0001B6
P:01A5 56FB1B           clr     b         x:-(r3),a
P:01A6 2D0D00           move              #CR,b1
P:01A7 200005           cmp     b,a
P:01A8 0AF0A2           jne     over
       0001B6

                        ;put all values in range of 0 to $5f
                        ;move to B_NUM
P:01AA 33001B           clr     b         #s_data,r3          ;set start of data buffer
P:01AB 2D2000           move              #$20,b1             ;set b = $20

P:01AC 060880           do      #8,get_chr
       0001B3
P:01AE 56DB00           move              x:(r3)+,a           ;get received character
P:01AF 0ACE47           bclr    #7,a                          ;mask high bit
P:01B0 200005           cmp     b,a                           ;check for a < $20
P:01B1 029000           tlt     b,a                           ;if < $20 then make = $20
P:01B2 200014           sub     b,a                           ;all values between 0 and $5f
P:01B3 565C00           move              a,x:(r4)+           ;update B_NUM
               get_chr
P:01B4 08F4B4           movep             #Beep,x:STX         ;send acknowledge
       000007
P:01B6 330000  over     move              #s_data,r3          ;reset pointer to start of table

P:01B7 70E100  under    move              x:(r1),n0           ;get T_NDX for this bin
P:01B8 703000           move              n0,x:enc_p          ;update encoder position
P:01B9 0C017A           jmp     L_DISP


                        ;Compressed dislplay file

P:01DC                  org     p:$1dc

                        ;threshold data
P:01DC                  dc      S939495
P:01DD                  dc      $909192
P:01DE                  dc      $878889
P:01DF                  dc      $848586
P:01E0                  dc      $818283
P:01E1                  dc      $787980
P:01E2                  dc      $757677
P:01E3                  dc      $727374

P:01E4                  dc      $697071
P:01E5                  dc      $666768
P:01E6                  dc      $636465
P:01E7                  dc      $606162
P:01E8                  dc      $575859
P:01E9                  dc      $545556
P:01EA                  dc      $515253
P:01EB                  dc      $484950

P:01EC                  dc      $454647
P:01ED                  dc      $424344
P:01EE                  dc      $394041
P:01EF                  dc      $363738
P:01F0                  dc      $333435
P:01F1                  dc      $303132
P:01F2                  dc      $272829
P:01F3                  dc      $242526

P:01F4                  dc      $212223
P:01F5                  dc      $181920
P:01F6                  dc      $151617
P:01F7                  dc      $121314
P:01F8                  dc      $091011
P:01F9                  dc      $060708
P:01FA                  dc      $030405
P:01FB                  dc      $c00102

                        ;frequency bin data

P:01FC                  dc      $050301
P:01FD                  dc      $110907
P:01FE                  dc      $001513
P:01FF                  dc      $000000

0    Errors
0    Warnings
```

I claim:

1. A multi-band, digital audio noise filter that permits a user to convert a digital audio input signal into a digital audio output signal, the filter comprising:

a signal processor that processes the digital audio input signal to obtain the digital audio output signal by multiplying each of a plurality of filter coefficients with each of a plurality of time-based digital samples which compose a finite-length window of the digital audio input signal and by summing the results to obtain a digital value that is an output value of the digital audio output signal;

a user-interface that permits the user to vary contribution-thresholds for at least several of a plurality of frequency bins that correspond to composition frequencies of the digital audio input signal;

a filter generator that repeatedly updates said filter coefficients in dependence upon current input values of each of said digital audio input signal and said contribution-threshold for said plurality of frequency bins, said filter generator including FFT means for receiving the digital audio input signal and applying thereto a Fast Fourier Transform to produce, in response thereto, at least one FFT value for each of the plurality of frequency bins, said FFT values each representing the contribution of harmonics to the digital audio input signal from frequencies within said frequency bins, index generating means for comparing, for each of said plurality of frequency bins, said FFT values which correspond to each frequency bin with a corresponding user-set signal threshold level, and for generating an attenuation index for each of said plurality of frequency bins in response thereto, said attenuation index representing an attenuation of harmonics within the frequency bin if said corresponding FFT value is less than said corresponding user-set signal threshold level, and, IFFT means coupled to said index generating means for generating and updating, in response to said attenuation index for each of said plurality of frequency bins, said plurality of filter coefficients.

2. A filter according to claim 1, wherein said FFT means includes frequency windowing means for smoothing frequencies of the digital audio input signal, such that distinct frequencies of said digital audio input signal fall substantially within one of said frequency bins.

3. A filter according to claim 2, wherein said IFFT means includes filter windowing means for smoothing frequencies represented in time by said filter coefficients, such that attenuation represented by said filter coefficients is applied substantially only to frequencies of the digital audio input signal which fall within frequency bins that correspond to the particular attenuation.

4. A filter according to claim 1, wherein said signal processor includes means for convolving a finite impulse response filter with said plurality of time-based digital samples which compose a finite-length window of the digital audio input signal to obtain therefrom said digital value that is an output value of the digital audio output signal.

5. A filter according to claim 1, wherein said attenuation index, for each frequency bin's corresponding FFT values, is selected to correspond to no attenuation of the digital audio input signal if said FFT values are not less than said corresponding user-set threshold, and is otherwise selected to pass corresponding composition frequencies of said digital audio input signal in an amount proportional to a ratio of said corresponding FFT value to said corresponding user-set threshold.

6. A filter according to claim 1, wherein said user-interface includes a fader control having a predefined number of faders that each control at least one of said contribution-thresholds, at least one fader controlling simultaneous selection of a plurality of said contribution-thresholds, said fader control having a digital electronic signal output coupled to said filter generator that represents a position-setting of each of said faders.

7. A filter according to claim 6, wherein each of said predefined number of faders control simultaneous selection of an equal number of said contribution-thresholds.

8. A filter according to claim 1, wherein said user-interface includes:

a threshold-control that permits the user to select a contribution-threshold for at least a predefined one of said frequency bins; and, a slope control that permits the user to select a rate of change between frequency bins and thereby select said contribution-thresholds, in relation to said contribution-thresholds for said predefined one, for said plurality of frequency bins.

9. A filter according to claim 1, wherein said FFT means includes adding means for summing time-based digital samples from each of left and right audio channels and for applying the Fast Fourier Transform thereto.

10. A filter according to claim 1, wherein:

said index generating means includes multiplying means for multiplying said attenuation index (for each frequency bin) with real and imaginary values to yield a corresponding scaled real and imaginary value pair; and said IFFT means includes means coupled to receive said scaled real and imaginary value pair for each of said plurality of frequency bins and for applying to said scaled real and imaginary value pair said inverse Fast Fourier Transform to thereby generate and update said plurality of filter coefficients.

11. A filter according to claim 1, wherein:

said index generating means further includes FFT value averaging means for averaging said FFT values with at least one old FFT value, for each frequency bin, to produce average FFT values; and, said index generating means compares, for each of said plurality of frequency bins, corresponding ones of said averaged FFT values with said corresponding user-set signal threshold level.

12. A filter according to claim 11, wherein said FFT value averaging means includes weighting means for applying a first weight to said FFT values and a second weight to said old FFT values, for each frequency bin, the sum of said first and second weights being approximately one, said weights being varied as a function of frequency bin.

13. A filter according to claim 1, wherein:

said signal processor includes convolution software that directs a microprocessor-based system to process the digital audio input signal by convolving in the time domain a finite impulse response filter with said finite length window; and, said filter generator includes filter configuration software that directs a microprocessor-based system to update said filter coefficients.

14. A multi-band, digital audio noise filter that permits a user to convert an audio input signal into a digital audio output signal, the filter comprising:

a user-interface whereby the user may vary contribution-thresholds for at least several of a plurality of frequency bins that correspond to frequencies which combine to form the digital audio input signal;

a digitizing mechanism that is coupled to receive the audio input signal, to sample said audio input signal, and to produce, in response thereto, a digitized audio input signal;

a microprocessor-based system having a first connector that couples said microprocessor-based system to said user-interface to receive therefrom said contribution-thresholds, convolution means for convolving a window of samples of said digitized audio input signal with a digital filter having filter coefficients and for producing therefrom the digital audio output signal, a second connector that couples said digitizing mechanism to said convolution means such that said convolution means receives said digitized audio input signal, and filter configuration software that directs said microprocessor-based system to periodically and repeatedly sample said user-interface so as to receive sampled, digitized threshold values representative of said user-set contribution-thresholds, apply a Fast Fourier Transform to said digitized audio input signal to produce therefrom estimates of signal contribution for each of said plurality of frequency bins, compare said estimates, for each of said plurality of frequency bins, with a corresponding one of said contribution-thresholds, derive attenuation indices for each of said plurality of frequency bins in response to the comparison, and perform an inverse Fast Fourier Transform in response to said attenuation indices so as to periodically and repeatedly update said filter coefficients of said digital filter, and convolution software that directs said convolution means to convolve said digitized audio input signal with said digital filter to produce said digital audio signal output.

15. A filter according to claim 14, wherein said digitizing mechanism includes a motion picture film soundtrack reading mechanism that reads the audio input signal from motion picture film, said digitizing mechanism generating therefrom said digitized audio input signal.

16. A filter according to claim 14, wherein:

said microprocessor-based system includes a first microprocessor;

said convolution means includes a second microprocessor coupled to said digitizing mechanism to receive therefrom said digitized audio input signal, said second microprocessor being directed by said convolution software to convolve said window with said digital filter and to produce from the convolution the digital audio output signal; and, wherein said filter configuration software directs said first microprocessor to communicate said filter coefficients of said digital filter to said second microprocessor.

17. A filter according to claim 14, wherein said microprocessor-based system includes a single microprocessor that is directed by both said convolution software and said filter configuration software.

18. A filter according to claim 14, wherein said filter configuration software includes software that directs said microprocessor based system to:

multiply a pair of real and imaginary values by a corresponding one of said attenuation indices to yield a scaled value pair for each of said plurality of frequency bins; and, perform said inverse Fast Fourier Transform upon said scaled value pair so as to periodically and repeatedly update said digital filter.

19. A filter according to claim 14, wherein said filter configuration software includes software that directs said microprocessor based system to:

apply to said digitized audio input signal a frequency window that smoothes frequencies of the digital audio input signal, such that distinct frequencies of said digital audio input signal fall substantially within one of said frequency bins; and, apply to said filter coefficients a filter window that smoothes frequencies represented in time by said filter coefficients, such that attenuation represented by said filter coefficients is applied substantially only to frequencies of said digitized audio input signal which fall within frequency bins that correspond to the particular attenuation.

20. A filter according to claim 14, wherein said filter further comprises soundtrack writing means for writing the digital audio output signal onto motion picture film as a soundtrack.

21. A method of reducing noise in at least one audio channel without the need of a test signal dedicated to noise measurement or a period of silence on an audio input signal, the method utilizing an analog-to-digital converter, data registers (which may be defined in random access memory), a microprocessor-based system that convolves (in the time-domain) a digital filter with the audio input signal to produce a digital audio output signal, and a user-interface adapted to create at least one electronic signal that represents user-variations of contribution-thresholds for at least several of a plurality of frequency bins, wherein the microprocessor-based system has random access memory and is coupled to the user-interface so as to receive the electronic signals, and wherein the digital filter is alterable in response to the user-settings of the contribution-thresholds for each of the plurality of frequency bins, the method comprising the steps of:

applying the analog-to-digital converter to the audio input signal to produce a sequence of digital samples that form a digital audio input signal representative of the audio input signal;

using the microprocessor-based system to obtain the contribution-thresholds by monitoring the electronic signals that represent the user-settings, apply a Fast Fourier Transform to a window of digital samples of the digital audio input signal to produce at least one FFT value for each of the plurality of frequency bins, for each of the plurality of frequency bins, compare the corresponding contribution-threshold with the corresponding FFT values, generate attenuation indices for each of the plurality of frequency bins in response to the comparison, the attenuation indices representing attenuation to be applied to all harmonic components falling within corresponding ones of the plurality of frequency bins, use a inverse Fast Fourier Transform to derive, from the attenuation indices, coefficients of the digital filter, and repeat each of the above steps to thereby periodically update coefficients of the digital filter; and, using the microprocessor-based system to apply the digital filter to the audio input signal to produce the audio output signal.

22. A method according to claim 21, wherein:

the step of obtaining the contribution-thresholds includes upon power-up, using the microprocessor-based system to define default contribution-thresholds for each of the plurality of frequency bins and to store the default contribution-thresholds in the registers, using the user-interface to select at least one frequency bin from among the plurality of frequency bins, using the user-interface to vary the contribution-thresholds that correspond to the selected frequency bins, and causing the microprocessor-based system to store new contribution-thresholds that correspond to the selected frequency bins in registers; and wherein the step of comparing the FFT values with the contribution-threshold includes the step of reading the contribution-threshold from the registers.

23. A method according to claim 21, wherein:

the step of obtaining the contribution-thresholds includes the steps of using the microprocessor-based system to define in the random access memory the registers as each corresponding to specific frequency bins, and repeatedly and periodically reading the user-interface to sample user-settings, writing the sampled contribution-thresholds represented thereby into the registers to define contribution-thresholds for the comparison step; and the step of comparing the contribution-threshold with the FFT values includes the step of reading the contribution-threshold from the corresponding register defined in random access memory.

24. A method according to claim 21, wherein:

the step of obtaining the contribution-thresholds includes the steps of using the microprocessor-based system to define in random access memory the registers as corresponding to specific frequency bins, repeatedly and periodically reading the user-interface to sample user-settings of a key contribution-threshold that corresponds to at least one of the frequency bins, and to sample a change value representative of change in magnitude between contribution-thresholds corresponding to contiguous frequency bins, determining contribution-thresholds for each of the plurality of frequency-bins in response to the key threshold-contribution and the change value, and writing the contribution-thresholds thereby determined into the registers to define contribution-thresholds for the comparison step; and the step of comparing the contribution-threshold with the FFT values includes the step of reading the contribution-threshold from the corresponding register defined in random access memory.

25. A method according to claim 21, utilizing at least two audio channels including a left audio channel and a right audio channel, each having left and right audio input signals, respectively, to produce corresponding digital audio output signals, wherein the method includes the steps of:

applying the analog-to-digital converter to each audio input signal to produce corresponding sequences of digital samples that form digital audio signals representative of each audio input signal;

using the microprocessor-based system to average together digital samples of each channel that correspond to the same time of sampling, and apply the Fast Fourier Transform to a window of averages to produce the FFT values;

using the microprocessor-based system to continuously apply the digital filter to each audio output signal to produce the corresponding digital audio output signals.

26. A method according to claim 21, wherein:

the step of using the microprocessor based system to apply the Fast Fourier Transform includes producing at least one pair of values representing real and imaginary FFT products, respectively;

the step of comparing includes comparing at least one of the real and imaginary FFT products, for each of the plurality of frequency bins, with the corresponding contribution-threshold; and, the step of using the inverse Fast Fourier Transform includes, for each frequency bin, multiplying a real and imaginary value pair with the corresponding one of the attenuation indices to obtain a pair of attenuation values for each frequency bin, and applying the inverse Fast Fourier Transform to all of the pairs of attenuation values to derive the coefficients of the digital filter.

27. A method according to claim 21, wherein the method further comprises the steps of:

using the microprocessor-based system to retain in the random access memory previous FFT values;

using the microprocessor-based system to obtain present FFT values by application of the Fast Fourier Transform;

using the microprocessor-based system to average together corresponding ones of the present FFT values and the previous FFT values to obtain averaged values to be used in the comparison step for comparison with the contribution-thresholds; and, repeating each of these averaging steps by writing into the random access memory the averaged values for future use as previous FFT values.

28. A method according to claim 27, wherein the step of using the microprocessor-based system to obtain averaged values includes the step of scaling each of present FFT values and previous FFT values for each frequency bin, wherein the sum of a first scalar, corresponding to present FFT values, and a second scalar, corresponding to past FFT values, is substantially equal to one, and wherein the relative contribution of present FFT values to the averaged values is relatively low for low frequencies.

29. A method according to claim 21, wherein the method further comprises the steps of:

using the microprocessor-based system to smooth frequencies of the digital audio input signal, such that distinct frequencies of said digital audio input signal fall substantially within one of the frequency bins; and, using the microprocessor-based system to smooth frequencies represented in time by the filter coefficients, such that attenuation represented by said filter coefficients is applied substantially only to frequencies of the digital audio input signal which fall within frequency bins that correspond to the particular attenuation.

30. A method according to claim 21, the method utilizing a motion picture film soundtrack reading device and a motion picture film soundtrack writing device to be used with motion picture film, and a digital-to-analog converter, the method further comprising the steps of:

using the motion picture film soundtrack reading device to obtain the audio input signal;

applying the audio output signal to the digital-to-analog converter to produce an analog audio output signal; and, using the motion picture film soundtrack writing device to write the analog audio output signal to motion picture film as a restored soundtrack.

31. A multi-band filter that attenuates noise in a prerecorded sound track in response to threshold settings interactively supplied from a user that concurrently listens to the audio output, comprising:

a user-interface that permits the user to independently vary thresholds for at least several of a plurality of frequency bins that represent harmonics of the sound track;

a signal processor that receives an input signal representing the sound track, applies a filter to it to provide attenuation to it, and generates therefrom the audio output;

a filter generator that repeatedly determines coefficients of the filter applied by said signal processor, said filter generator including a Fast Fourier Transform stage that receives the input signal and applies to the input signal a Fast Fourier Transform to produce, in response thereto, at least one value for each of frequency bin, an index generating stage that receives the thresholds from the user-interface, compares said at least one value for each bin with a corresponding threshold, and derives an attenuation index that represents attenuation of harmonics within the frequency bin if said corresponding FFT value is less than said corresponding user-set threshold, and, an Inverse Fast Fourier Transform stage that processes said attenuation index for each of said plurality of frequency bins, to derive the coefficients of the filter; and an audio player that permits the user to concurrently listen to the audio output and interactively adjust the thresholds for the frequency bins.

* * * * *